(12) United States Patent
Howell et al.

(10) Patent No.: US 9,753,754 B2
(45) Date of Patent: Sep. 5, 2017

(54) ENFORCING DETERMINISTIC EXECUTION OF THREADS OF GUEST OPERATING SYSTEMS RUNNING IN A VIRTUAL MACHINE HOSTED ON A MULTIPROCESSOR MACHINE

(75) Inventors: Jonathan R. Howell, Seattle, WA (US); Eric Traut, Bellevue, WA (US); Jacob R. Lorch, Bellevue, WA (US); John R. Douceur, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2062 days.

(21) Appl. No.: 11/489,819

(22) Filed: Jul. 20, 2006

(65) Prior Publication Data
US 2006/0259818 A1 Nov. 16, 2006

Related U.S. Application Data

(63) Continuation-in-part of application No. 11/021,983, filed on Dec. 22, 2004, now abandoned.

(51) Int. Cl.
*G06F 9/46* (2006.01)
*G06F 9/455* (2006.01)
*G06F 11/14* (2006.01)

(52) U.S. Cl.
CPC ...... *G06F 9/45558* (2013.01); *G06F 11/1484* (2013.01); *G06F 2009/45566* (2013.01); *G06F 2201/815* (2013.01)

(58) Field of Classification Search
CPC ............. G06F 9/45558; G06F 11/1484; G06F 2009/45566; G06F 2201/815
See application file for complete search history.

(56) References Cited

U.S. PATENT DOCUMENTS

| | | |
|---|---|---|
| 4,564,903 A | 1/1986 | Guyette et al. |
| 4,811,276 A | 3/1989 | Suga |
| 5,307,495 A | 4/1994 | Seino et al. |
| 5,488,716 A | 1/1996 | Schneider et al. |
| 5,613,153 A | 3/1997 | Arimilli et al. |
| 5,898,855 A | 4/1999 | Onodera et al. |
| 6,075,938 A | 6/2000 | Bugnion et al. |
| 6,167,492 A | 12/2000 | Keller et al. |
| 6,457,065 B1 | 9/2002 | Rich et al. |

(Continued)

FOREIGN PATENT DOCUMENTS

| | | |
|---|---|---|
| JP | 12348000 A | 12/2000 |
| WO | WO 93/09494 A1 | 5/1993 |

OTHER PUBLICATIONS

Smith, et al., "An Overview of Virtual Machine Architectures", Nov. 1, 2003.

(Continued)

*Primary Examiner* — James J Lee
(74) *Attorney, Agent, or Firm* — Baker & Hostetler LLP

(57) ABSTRACT

A virtual machine monitor (VMM) is configured to enforce deterministic execution of virtual machines in a multiprocessor machine. The VMM is configured to ensure that any communication by physical processors via shared memory is deterministic. When such VMMs are implemented in a distributed environment of multiprocessor machines coupled via a logical communication link, non-deterministic server applications running on virtual machines using the VMM may be replicated.

17 Claims, 18 Drawing Sheets

(56) References Cited

U.S. PATENT DOCUMENTS

| | | | |
|---|---|---|---|
| 6,460,178 | B1 | 10/2002 | Chan et al. |
| 6,463,532 | B1 | 10/2002 | Reuter et al. |
| 6,496,847 | B1 | 12/2002 | Bugnion et al. |
| 6,535,941 | B1 | 3/2003 | Kruse |
| 6,625,751 | B1 | 9/2003 | Starovic et al. |
| 6,802,062 | B1 | 10/2004 | Oyamada et al. |
| 6,961,941 | B1 | 11/2005 | Nelson et al. |
| 7,127,548 | B2* | 10/2006 | Bennett et al. .................. 711/6 |
| 7,222,221 | B1* | 5/2007 | Agesen ............... G06F 9/45537 707/999.2 |
| 7,296,267 | B2 | 11/2007 | Cota-Robles et al. |
| 7,334,154 | B2 | 2/2008 | Lorch et al. |
| 7,356,817 | B1* | 4/2008 | Cota-Robles et al. ........... 718/1 |
| 2003/0018684 | A1* | 1/2003 | Ohsawa et al. ............... 709/102 |
| 2003/0217131 | A1* | 11/2003 | Hodge ..................... G06F 8/63 709/223 |
| 2004/0199820 | A1 | 10/2004 | Hogdal et al. |
| 2004/0220970 | A1 | 11/2004 | Wilson |
| 2005/0044301 | A1 | 2/2005 | Vasilevsky et al. |
| 2005/0076155 | A1 | 4/2005 | Lowell |
| 2005/0076156 | A1* | 4/2005 | Lowell .............. 710/1 |
| 2005/0076324 | A1* | 4/2005 | Lowell et al. ................. 717/100 |
| 2005/0198303 | A1* | 9/2005 | Knauerhase et al. ......... 709/227 |
| 2005/0273507 | A1 | 12/2005 | Yan et al. |
| 2005/0283586 | A1* | 12/2005 | Mondal et al. .................. 712/1 |
| 2006/0005200 | A1 | 1/2006 | Vega et al. |

OTHER PUBLICATIONS

Smith, et al., "Virtual Machine Architectures, Implementations, and Applications", 2005.
International Search Report, PCT/US2007/13336, Dated: Dec. 31, 2007, pp. 1-12.
Bressoud et al., "Hypervisor-Based Fault-Tolerance", ACM Transactions on Computer Systems, Feb. 1996, 14(1), 80-107.
Bressoud et al., "Hypervisor-Based Fault-Tolerance", Proceedings of the 15$^{th}$ ACM Symposium on Operating Sysems Principles, Dec. 1995, 1-11.
Derry et al., "CPX—An Experimental Virtual Machine Monitor", Proceedings of the Compcon Fall 79, Sep. 4-7, 1979, 214-217.
Dunlap et al., "ReVirt: Enabling Intrusion Analysis Through Virtual-Machine Logging and Replay", Proceedings of the 5th symposium on Operating systems design and implementation (OSDI), Nov. 2002, 211-224.
EP Application No. 05112488.1 : Extended European Search Report, Mar. 21, 2006, 12 pages.
Friedman et al., "Transparent Fault-Tolerant Java Virtual Machine", Proceedings of the 22nd IEEE Symposium on Reliable Distributed Systems(SRDS'03), Oct. 6-18, 2003, 10 pages.
Koptez, "The design of fault-tolerant real-time systems", Euromicro '94. System Architecture and Integration, Proceedings of the 20th Euromlcro Conference, Liverpool, UK, Sep. 5-8, 1994, 4-9.
Shankland, "Next IBM-Apple Chip Getting High-End Feature", CNET News, http://news.cnet.com/2100-1006_3-5499954.html, Dec. 21, 2004, 5 pages.

* cited by examiner

ENFORCING DETERMINISTIC EXECUTION OF THREADS OF GUEST OPERATING SYSTEMS RUNNING IN A VIRTUAL MACHINE HOSTED ON A MULTIPROCESSOR MACHINE

CROSS-REFERENCE TO RELATED APPLICATIONS

This is a continuation-in-part of U.S. patent application Ser. No. 11/021,983 filed Dec. 22, 2004, which is incorporated by reference herein.

BACKGROUND

In this description and claims, a "processor" is either a single-core processor or a core of a multiple-core processor (for example dual-core or quad-core processors), and a "multiprocessor machine" (also known as a multiple processor machine) is a single computer system having two or more "processors".

A multiprocessor machine is fundamentally non-deterministic, in that each processor handles a sequence of instructions (also known as an instruction stream) but the order in which the instructions of one stream are executed relative to the instructions of another stream is not predictable.

There are several causes for this non-deterministic behavior, including, for example, variations in the environment (e.g. temperature), variations in the manufacturing of the individual processors and components that interface with the processors (e.g. crystals that dictate the precise clock rate of the system), variations in the configuration of the processors or systems (e.g. power management and user settings), the handling of asynchronous events in the machine, and the like.

For example, a first processor and a second processor may concurrently execute 600 instructions of their respective instruction streams, but there is no guarantee as to whether the first processor will execute its $412^{th}$ instruction before or after the second processor executes its $415^{th}$ instruction. This non-determinism exists regardless of whether the instructions streams are different or identical, and exists even if the two processors are identical.

Furthermore, if the same input is provided to the two processors on two different occasions, there is no guarantee that on both occasions the relative order in which the instructions are executed by the processors will be the same. On the first occasion, the first processor may execute its $412^{th}$ instruction before the second processor executes its $415^{th}$ instruction, and on the second occasion, the first processor may execute its $412^{th}$ instruction after the second processor executes its $415^{th}$ instruction.

Likewise, if the same input is provided to two identical multiprocessor machines, there is no guarantee that on both computers the relative order in which the instructions are executed by their processors will be the same. On one of the machines, the first processor may execute its $412^{th}$ instruction before the second processor executes its $415^{th}$ instruction, and on the other machine, the first processor may execute its $412^{th}$ instruction after the second processor executes its $415^{th}$ instruction.

Suppose that in the previous example the $412^{th}$ instruction to be executed by the first processor is writing a new value to a particular region of the memory and the $415^{th}$ instruction to be executed by the second processor is reading that particular region of the memory. If the first processor writes before the second processor reads, then the second processor will read the new value written by the first processor. However, if the first processor writes after the second processor reads, then the second processor will read an old value that was stored in the particular region. On most computers, memory accesses are serialized by bus arbitration and cache logic, hence simultaneous access to the same region in memory by more than one processor is typically not possible. Even if simultaneous access is possible, the results of such accesses is still non-deterministic. Therefore, multiple processors may compete for access to a particular region in memory. The order in which they are granted access by the hardware, namely the memory bus and cache logic, is not deterministic. In a typical multiprocessor machine, different instruction streams, each executing on a different processor, communicate with each other through memory. If the order in which the processors access the memory is not deterministic, then the communication among the processors is also not deterministic.

In computer science, replication refers to the use of redundant resources, such as software or hardware components, to improve reliability, fault-tolerance, and/or performance. A replicated service in a distributed computing environment is where several machines run the same application, so that it appears to a user of the service that there is a single machine running the application. Each machine in the group is a replica of the others. If any machine in the group fails, the failure is hidden and the service is still available to the user. If two or more identical multiprocessor machines are intended to be replicas of one another and are provided with the same input, the non-deterministic behavior of each machine may result in different decisions being made by the different machines. The different decisions may result in the machines having different states, which in turn, will lead to further differences in their behavior. The machines will no longer be replicas of one another.

Software testing and/or debugging may also be affected by non-determinism. If software is intended to be run on a multiprocessor machine, then the fundamental non-determinism of the multiprocessor machine may affect the testing and/or debugging of the software. It is difficult to test software if one cannot guarantee that operating the software in a particular manner with known inputs will result in the same outputs each time the test is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A multiprocessor machine is fundamentally non-deterministic, in that each processor handles a sequence of instructions (also known as an instruction stream) but the order in which the instructions of one stream are executed relative to the instructions of another stream is not predictable. Multiple processors may compete for access to a particular region in memory. The order in which they acquire access is not deterministic. In a typical multiprocessor machine, different instruction streams, each executing on a different processor, communicate with each other through memory. If the order in which the processors access the memory is not deterministic, then the communication among the processors is also not deterministic.

A virtual machine monitor running in a multiprocessor can be configured to enforce deterministic execution of the threads and guest operating system running in a virtual machine in a multiprocessor machine, even though the virtual machine, guest operating system and threads may be non-deterministic. This involves both ensuring that asynchronous events are handled deterministically, and ensuring that any communication via shared memory of the machine occurs deterministically.

To deterministically handle asynchronous events, the virtual machine monitor controls the physical processors to complete a deterministic burst of execution by executing instructions of virtual machines until either the deterministic burst of execution has been performed or execution has halted due to a memory access violation.

One way to enforce that communication is deterministic is to enforce a limitation that no single virtual machine may be scheduled concurrently to more than one of the physical processors. On the assumption that different virtual machines are mapped by the virtual machine monitor to access different regions of the memory, then in this case, there is no shared memory and no communication between the physical processors.

Another way to enforce that communication is deterministic is for the virtual machine monitor to impose restrictions on access by the physical processors to a physical machine address space. For example, during a deterministic burst of execution, a particular region of the physical address space may have one of the following policies applied to it by the restrictions:

"Single Writer, No Readers"—one of the physical processors has permission to write to or read from the particular region, but no others of the physical processors have permission to read from or write to the particular region; and "No Writers, Multiple Readers"—one or more of the physical processors has permission to read the particular region, but none of the physical processors has permission to write to the particular region.

A set of restrictions for a deterministic burst of execution may include solely "Single Writer, No Readers" policies. In that case, no region of memory is accessible concurrently by more than one of the physical processors. Alternatively, a set of restrictions for a deterministic burst of execution may include different policies for different regions of the physical machine address space. The virtual machine monitor may determine new restrictions to impose at boundaries between deterministic bursts of execution.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
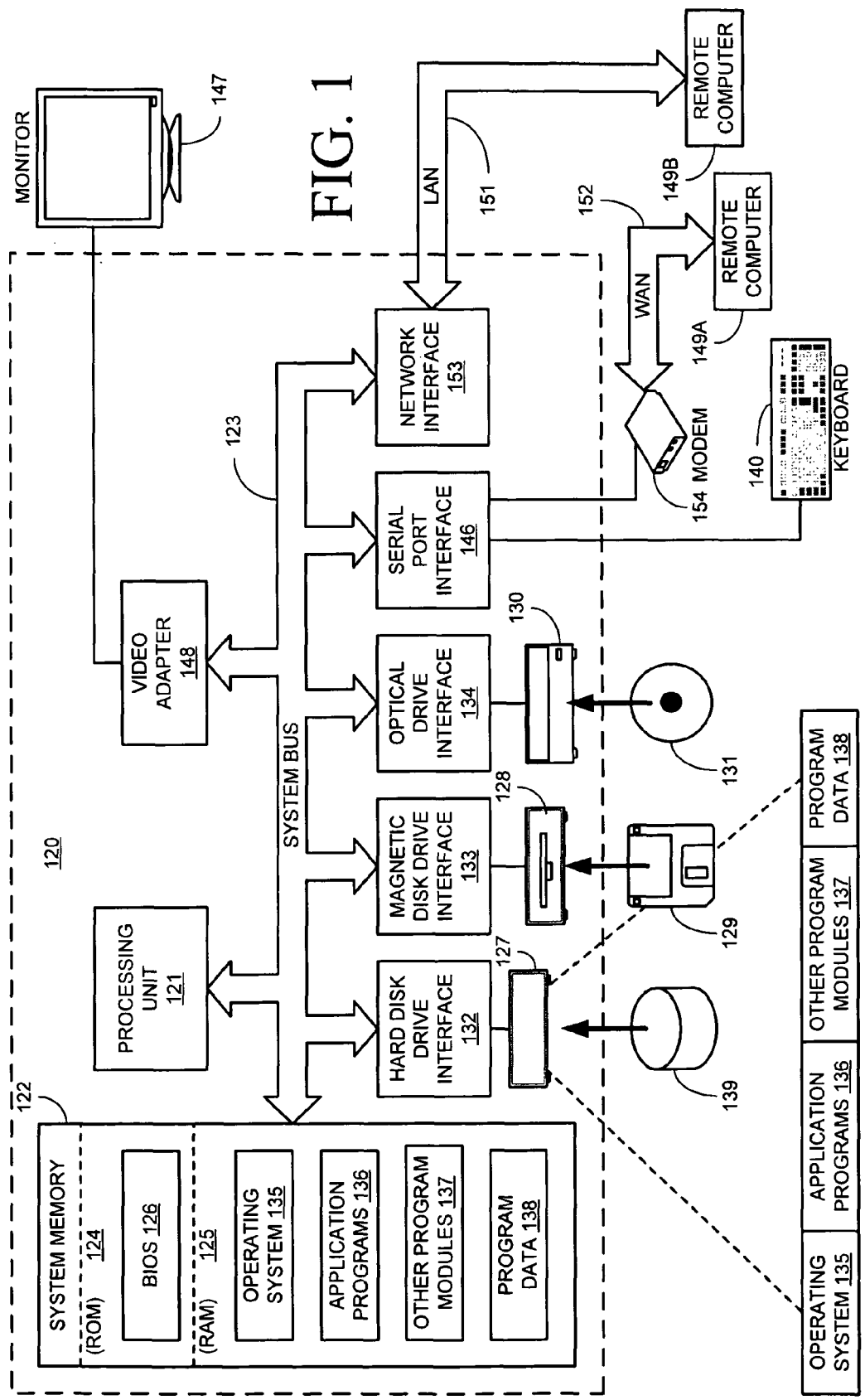
FIG. 1 illustrates an exemplary system for implementing some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

Embodiments within the scope of the present invention include computer-readable media for carrying or having computer-executable instructions or data structures stored thereon. Such computer-readable media can be any available media that can be accessed by a general-purpose or special-purpose computer. By way of example, and not limitation, such computer-readable media may comprise physical computer-readable media such as RAM, ROM, EEPROM, flash memory or other memory technology, CD-ROM, DVD or other optical disk storage, magnetic disk storage or other magnetic storage devices, or any other medium which can be used to carry or stored desired program code means in the form of computer-executable instructions or data structures and which can be accessed by a general-purpose or special purpose computer.

When information is transferred or provided over a network or another communications connection (hardwired, wireless, optical or any combination thereof) to a computer system, the computer system properly views the connection as a computer-readable medium. Thus, any such connection is properly termed a computer-readable medium. Combinations of the above should also be included within the scope of computer-readable media. Computer-executable instructions comprise, for example, any instructions and data which cause a general-purpose computer system, special-purpose computer system, or special-purpose processing device to perform a certain function or group of functions. The computer-executable instructions may be, for example, binaries, intermediate format instructions such as assembly language, or even source code.

In this document, a "logical communication link" is defined as any communication path that can enable the transport of electronic data between two entities such as computer systems or modules. The actual physical representation of a communication path between two entities is not important and can change over time. A logical communication link can include portions of a system bus, a local area network (e.g., an Ethernet network), a wide area network, the Internet, combinations thereof, or portions of any other path that may facilitate the transport of electronic data. Logical communication links can include hardwired links, wireless links, or a combination of hardwired links and wireless links. Logical communication links can also include software or hardware modules that condition or format portions of electronic data so as to make them accessible to components that implement the principles of the present invention. Such modules include, for example, proxies, routers, firewalls, switches, or gateways. Logical communication links may also include portions of a virtual network, such as, for example, Virtual Private Network ("VPN") or a Virtual Local Area Network ("VLAN").

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

With reference to FIG. 1, an exemplary system for implementing the invention comprises a general-purpose computing device in the form of a conventional computer 120, comprising a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory comprises read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also comprise a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer-executable instructions, data structures, program modules, and other data for the computer 120. Although the exemplary environment described herein employs a magnetic hard disk 139, a removable magnetic disk 129, and a removable optical disk 131, other types of computer readable media for storing data can be used, including magnetic cassettes, flash memory cards, digital video disks, Bernoulli cartridges, RAMs, ROMs, and the like.

Program code means having one or more program modules may be stored on the hard disk 139, magnetic disk 129, optical disk 131, ROM 124 or RAM 125, comprising an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port, or a universal serial bus (USB). A monitor 147 or another display device is also connected to system bus 123 via an interface, such as video adapter 148. In addition to the monitor, personal computers typically comprise other peripheral output devices (not shown), such as speakers and printers.

The computer 120 may operate in a networked environment using logical communication links to one or more remote computers, such as remote computers 149a and 149b. Remote computers 149a and 149b may each be another personal computer, a client, a server, a router, a switch, a network PC, a peer device or other common network node, and can comprise many or all of the elements described above relative to the computer 120. The logical communication links depicted in FIG. 1 comprise local area network ("LAN") 151 and wide area network ("WAN") 152 that are presented here by way of example and not limitation. Such networking environments are commonplace in office-wide or enterprise-wide computer networks, intranets and the Internet.

When used in a LAN networking environment (e.g. an Ethernet network), the computer 120 is connected to LAN 151 through a network interface or adapter 153, which can be a wired or wireless interface. When used in a WAN networking environment, the computer 120 may comprise a wired link, such as, for example, modem 154, a wireless link, or other means for establishing communications over WAN 152. The modem 154, which may be internal or external, is connected to the system bus 123 via the serial port interface 146. In a networked environment, program modules depicted relative to the computer 120, or portions thereof, may be stored in at a remote memory storage device. It will be appreciated that the network connections shown are exemplary and other means of establishing communications over wide area network 152 may be used.

While FIG. 1 illustrates an example of a computer system that may implement the principles of the present invention, any computer system may implement the features of the present invention. In the description and in the claims, a "computer system" is defined broadly as any hardware component or components that are capable of using software to perform one or more functions. Examples of computer systems include desktop computers, laptop computers, Personal Digital Assistants ("PDAs"), telephones (both wired and mobile), wireless access points, gateways, firewalls, proxies, routers, switches, hand-held devices, multi-processor systems, microprocessor-based or programmable consumer electronics, network PCs, minicomputers, mainframe computers, embedded computing devices (e.g. computing devices built into a car or ATM (automated teller machine)) or any other system or device that has processing capability.

Those skilled in the art will also appreciate that the invention may be practiced in network computing environments using virtually any computer system configuration. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Virtual Machines

Figure 2:
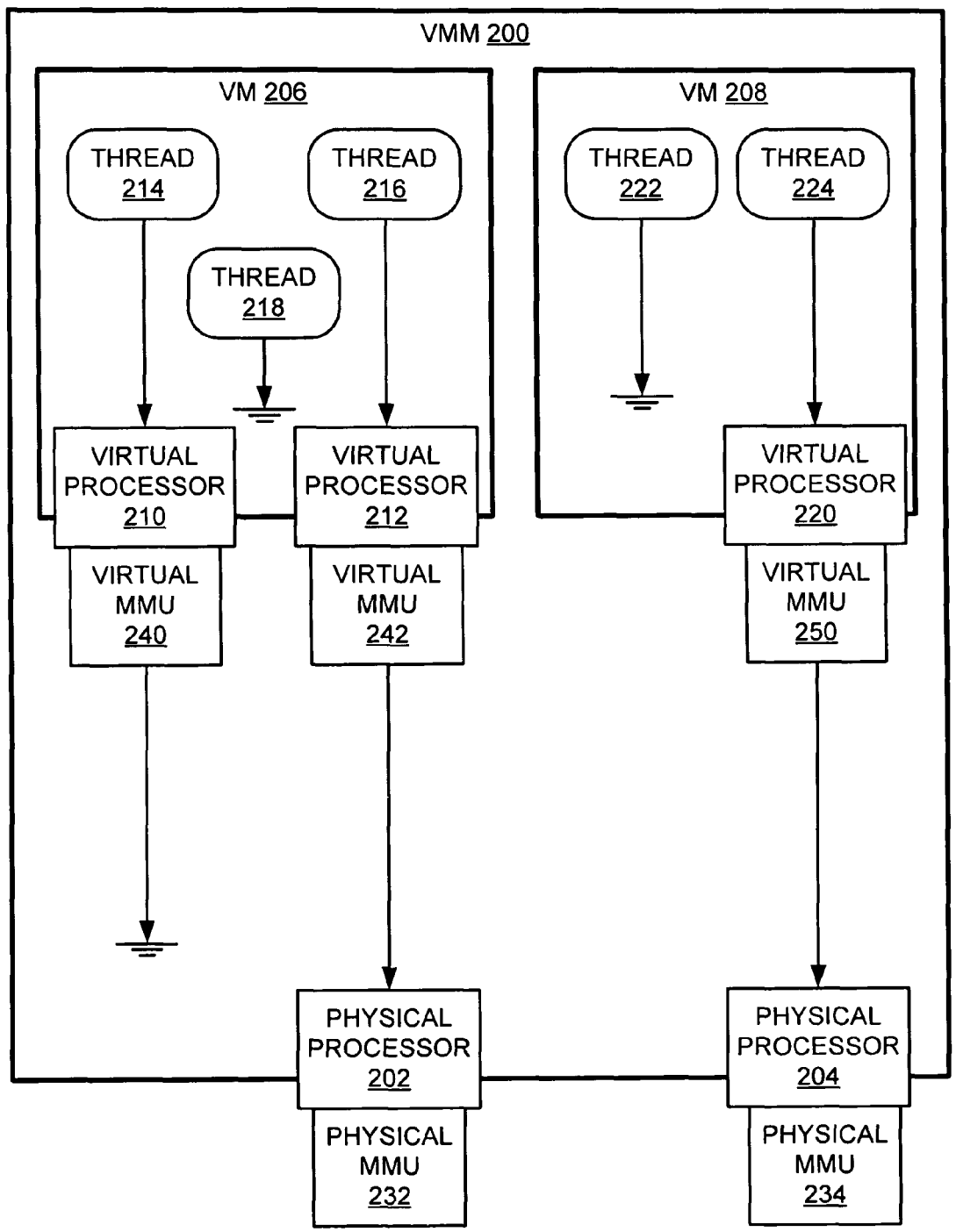
FIG. 2 illustrates the virtualization of processing resources by an exemplary virtual machine monitor.
Figure 3:
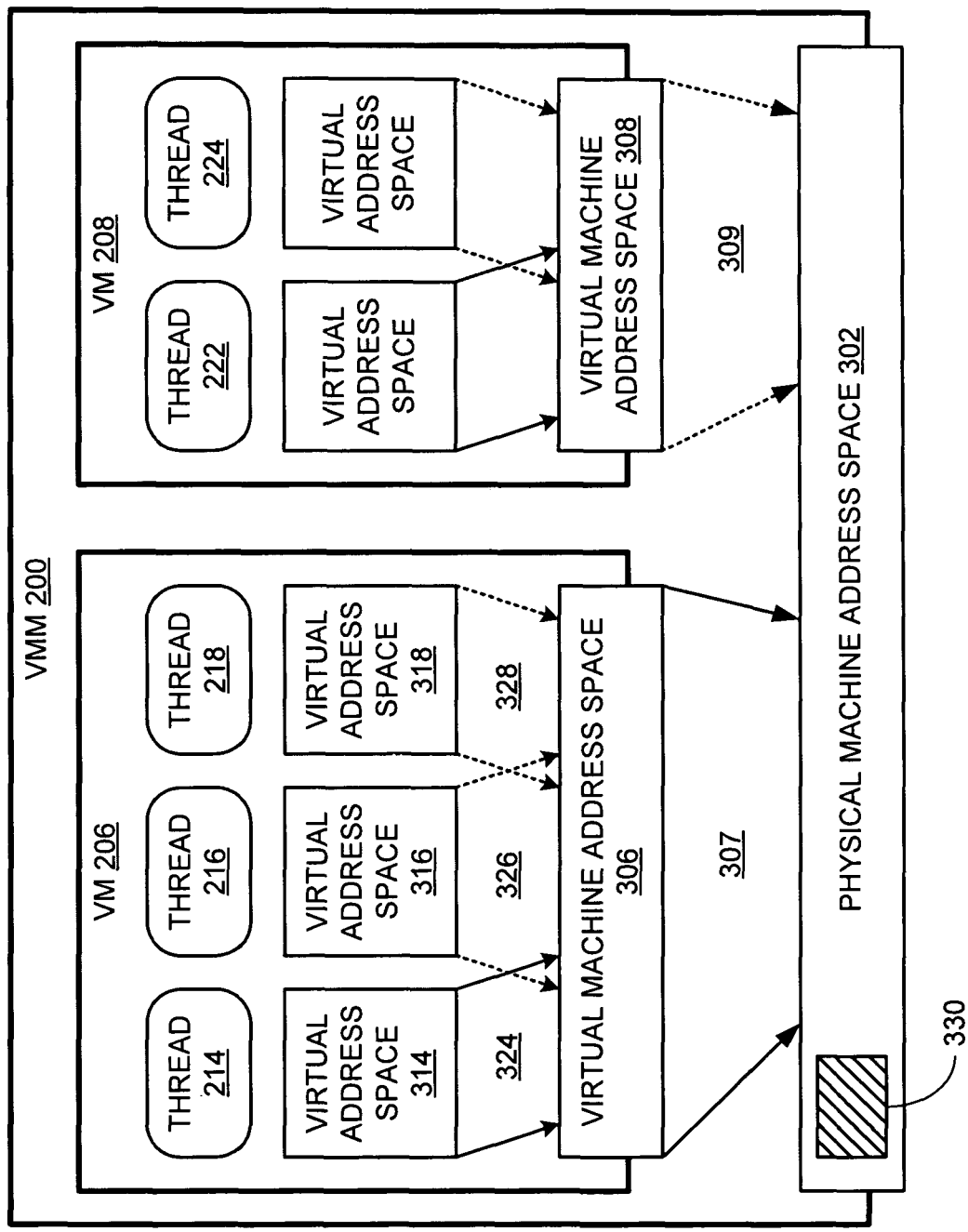
FIG. 3 illustrates the virtualization of memory by an exemplary virtual machine monitor.

In embodiments of the invention, computer system 100 is a multiprocessor machine and one of applications 112 is a virtual machine monitor (VMM). FIG. 2 illustrates the virtualization of processing resources by an exemplary VMM 200, and FIG. 3 illustrates the virtualization of memory by VMM 200.

A virtual machine (VM) is a logical instance of a computer system implemented through the use of a virtual machine monitor (VMM). The VMM is software that virtualizes the resources of the underlying platform, presenting virtualized disk, virtualized processors, virtualized physical memory, virtualized network interface, and so forth, to the VM. Software that runs in the VM is a "guest", for example, a "guest operating system" and guest applications.

In a hosted VMM, the VMM process is treated much like another application on the computer, and shares use of a computer's processor with other applications. A hosted VMM may rely on the computer's operating system to provide device drivers and other lower-level services. An alternative non-hosted VMM is called a "hypervisor", in which the VMM interacts directly with the physical resources. Embodiments of the invention are applicable to both types of VMM.

To reduce overhead, a VMM typically arranges for the physical processor to directly execute most of the instruction stream. However, in some instances it may be useful for the VMM to exert more precise control over how instructions are executed, such as to simulate the behavior of privileged instructions and to redirect input/output operations to the virtualized resources. In such circumstances, the VMM traps the instructions and simulates the behavior of the instructions in software. If a particular processor architecture has instructions that cannot be trapped but whose behavior needs to be augmented for virtualization, dynamic binary rewriting may be used to replace instances of these instructions with explicit trap instructions. Alternatively, the VMM may simulate a processor, evaluating each operation in software, so that the only instructions executed directly by the physical processor are those that comprise the VMM's simulator. Doing so greatly slows operation. However, arranging for the physical processor to execute guest threads and a guest operating system directly permits a VMM to operate without having to simulate a processor during all operations.

The VMM allows two or more virtual machines to share a single physical machine address space and a limited pool of physical processors, although it is also possible for a VMM to have a single VM. In the example illustrated in FIG. 2 and FIG. 3, the machine has two physical processors 202 and 204 and a physical machine address space 302. VMs 206 and 208 run conventional operating systems, each managing some threads.

VM 206 is a logical instance of a computer having two processors, virtual processor 210 and virtual processor 212. Since VM 206 has two virtual processors, a guest operating system running in VM 206 can support concurrent execution of two threads, for example, threads 214 and 216. A third thread 218 of the guest operating system is suspended awaiting processing resources. To provide the illusion of a sufficient supply of processing resources to satisfy the number of threads that are ready to perform work, each virtual processor is periodically interrupted, and a scheduler of the guest operating system determines which thread to assign to which virtual processor next.

FIG. 2 shows threads 214 and 216 assigned to virtual processors 210 and 212, respectively. VM 208 is a logical instance of a computer having one processor, virtual processor 220. Since VM 208 has only one virtual processor, a guest operating system running in VM 208 can support the execution of only one thread at a time, for example, a thread 224. Another thread 222 of the guest operating system is suspended awaiting processing resources.

VMM 200 simulates multiple flows of control to allow virtual processors 210, 212 and 220 to share physical processors 202 and 204. FIG. 2 shows physical processors 202 and 204 handling the processing of virtual processors 212 and 220, respectively. Consequently, VMM 200 has loaded physical processors 202 and 204 with the contexts of threads 216 and 224, respectively. The context of a thread comprises register states such as its program counter, indicating which instruction of the thread to execute next. Virtual processor 210 and its assigned thread 214 are suspended awaiting processing resources.

Physical machine address space 302 is shown in FIG. 3 and is the actual physical memory of the machine. For example, it corresponds to system memory 104 of computer system 100. VMM 200 allocates a portion of physical machine address space 302 to each VM. The portion allocated to VM 206 appears to VM 206 as a virtual machine address space 306, and the portion allocated to VM 208 appears to VM 208 as a virtual machine address space 308. For example, physical machine address space 302 may be 2 GB in size, and VMM 200 may allocate 1 GB to VM 206 and ½ GB to VM 208. VM 206 is a logical instance of a computer having 1 GB of memory (virtual machine address space 306), and VM 208 is a logical instance of a computer having ½ GB of memory (virtual machine address space 308), even though both VM 206 and VM 208 are implemented through the use of VMM 200, which is actually running on a machine with 2 GB of memory (physical machine address space 302). VMM 200 has mappings 307 and 309 from virtual machine address spaces 306 and 308, respectively, to physical machine address space 302.

As is known, each thread also has its own virtual address space. One reason for this is to limit the damage that can be done to the memory by a particular application, for example, if the application crashes. FIG. 3 shows virtual address spaces 314, 316 and 318 for threads 214, 216 and 218, respectively. VM 206 has mappings 324, 326 and 328 from virtual address spaces 314, 316 and 318, respectively, to virtual machine address space 306.

A mapping is used for the translation of addresses from one address space to another and is accompanied by permissions for access to the memory at those addresses. In this description and the claims, "permission to write" means permission to write and/or read. A computer system's memory is carved into regions known as pages, and permission to access the memory is provided on a per-page basis. In modern computer systems, a page is typically 4 kilobytes in size, but embodiments of this invention are also applicable to other page sizes.

For efficiency, a physical processor comprises dedicated hardware that is responsible for handling memory accesses requested by the processor. This dedicated hardware is known as the processor's memory management unit (MMU). In a multicore processor there is a separate MMU for each core. An MMU translates virtual addresses specified by the instructions of the thread it executes to the physical addresses in the memory of the machine and enforces access permissions to the memory. Similarly, each virtual processor comprises a virtual MMU. FIG. 2 shows physical MMUs 232 and 234 for physical processors 202 and 204, respectively, and virtual MMUs 240, 242 and 250 for virtual processors 210, 212 and 220, respectively.

As is known, when a guest operating system running in a VM assigns a thread to a virtual processor, the guest operating system "installs" a mapping and the permissions that the guest operating system wants to establish for that thread into the virtual processor's MMU. This mapping comprises the translation of addresses from the thread's virtual address space to the virtual machine address space. For example, thread 216 may request from the guest operating system permission to read pages 3 and 4 and to write pages 9, 10 and 11 of virtual address space 316. In mapping 326, this is equivalent to requesting permission to read pages 1027 and 1028 and to write pages 1031, 1032 and 1033 of virtual machine address space 306. Since thread 216 is assigned to virtual processor 212, the guest operating system running in VM 206 installs mapping 326 and its accompanying permissions in virtual MMU 242.

As is known, since both the virtual processor and the virtual MMU are virtual, the instructions that install the mapping and its accompanying permissions are intercepted by the VMM. The VMM composes the installed mapping with its own mapping, which comprises the translation of addresses from the virtual machine address space to the physical machine address space. Likewise, the permissions that the guest operating system wants to establish are composed with the permissions that the VMM wants to establish. In this composition, the more restrictive permissions survive. If a guest operating system wants to establish write permission for a particular page of memory and the VMM wants to establish only read permission for that page, then the composition comprises only read permission. Likewise, if a guest operating system wants to establish write permission or read permission for a particular page and the VMM wants to bar any access to that page, then the composition bars any access to that page. VMM 200 stores the composed mapping and the composed permissions in its own working area of physical machine address space 302, as indicated by striped box 330.

Deterministic Communication Via Shared Memory

In embodiments of the invention, the VMM is configured to enforce deterministic execution of the threads and guest operating system running in a virtual machine in a multi-processor machine, even though the virtual machine, guest operating system and threads may be non-deterministic. This involves both ensuring that asynchronous events are handled deterministically, which is described in more detail below with respect to FIGS. 10-15, and ensuring that any communication via shared memory of the machine occurs deterministically.

In one embodiment, the VMM ensures that any communication via shared memory is deterministic by enforcing a limitation that no single VM may be scheduled to more than one physical processor concurrently. This has the effect of completely preventing concurrent access to shared memory. Consider the allocation of processing resources shown in FIG. 2. Each physical processor is assigned to a different VM. On the assumption that the mappings for the different VMs from the virtual machine address space to the physical machine address space do not overlap, the compositions of mappings for the threads being executed concurrently by the physical processors do not have any memory pages in common. As in the prior art, VMM 220 installs the composition in the physical MMU that will actually be executing the instructions of the thread. Concurrent execution of thread 216 and thread 224 by physical processors 202 and 204, respectively, if executed deterministically as described below, never results in non-deterministic access to shared memory because there is no shared memory. However, enforcing this limitation means that effectively each VM is a single-processor machine, and therefore there is no communication via shared memory.

To exploit the benefits of multiprocessing, it may be desirable for a single VM to be scheduled to more than one physical processor simultaneously. In another embodiment, the VMM maintains a set of additional restrictions on the access to the physical machine address space in order to ensure that any communication via shared memory is deterministic. When composing the permissions that the guest operating system running in the VM wants to establish with the permissions that the VMM wants to establish, the VMM modifies the composition to conform to these additional restrictions, and installs the modified composition of the permissions in the physical MMU.

In the simplest version, a "Single Writer, No Readers" policy is used by the VMM to ensure that no memory page is accessible (with read permission or with write permission) according to the mapping in more than one physical MMU concurrently. In another version, described in more detail below, combinations of policies are used by the VMM to ensure that any communication between physical processors is deterministic.

Figure 4:
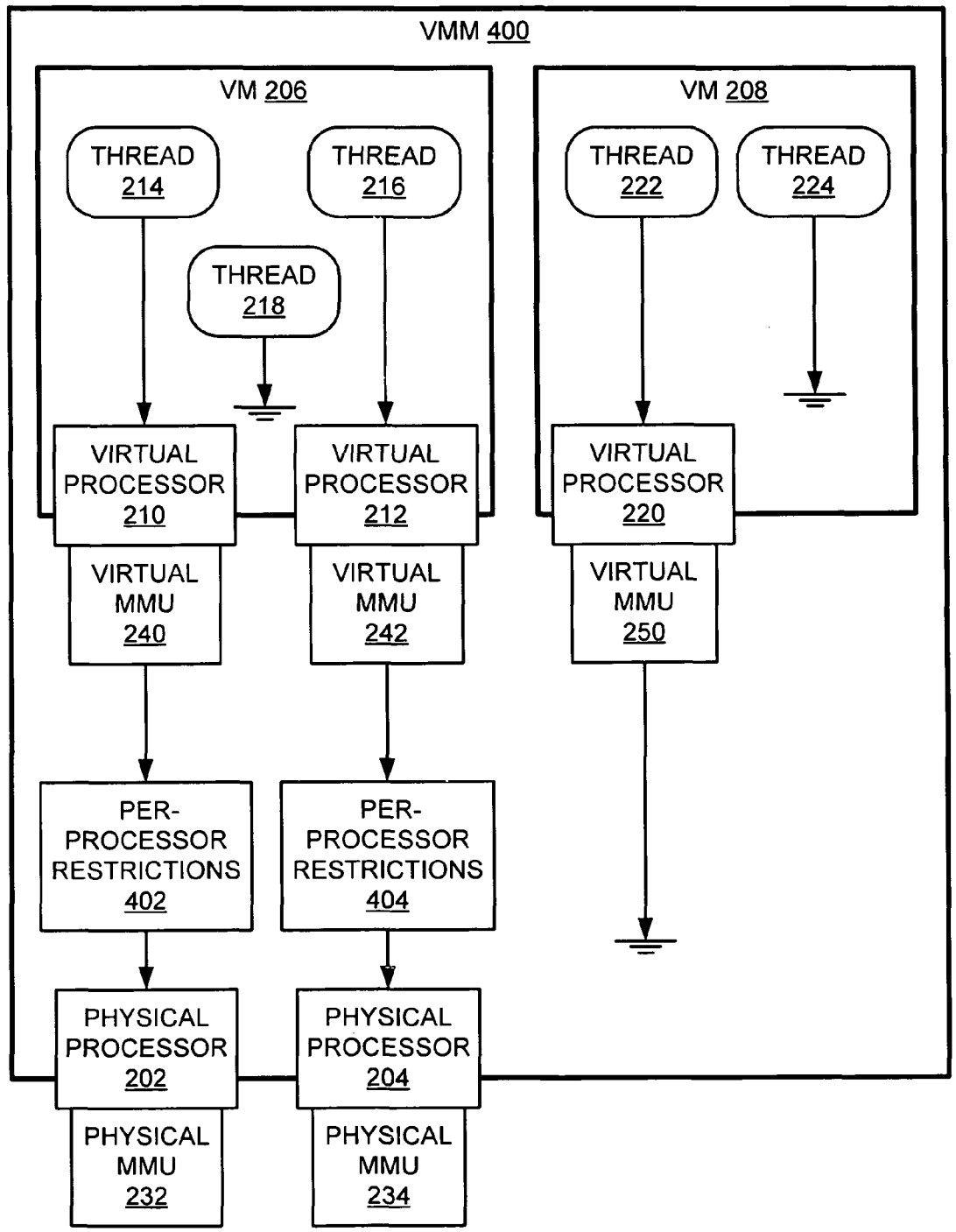
FIG. 4 illustrates the virtualization of processing resources by an exemplary virtual machine monitor.

FIG. 4 illustrates the virtualization of processing resources by an exemplary virtual machine monitor. Physical processors 202 and 204 are handling the processing of virtual processors 210 and 212, respectively. A VMM 400 has loaded physical processors 202 and 204 with the contexts of threads 214 and 216, respectively. Virtual processor 220 and its assigned thread 222 are suspended awaiting processing resources. Likewise, threads 218 and 224, currently unassigned to any virtual processors, are suspended awaiting processing resources.

In FIG. 4, the additional restrictions for physical processors 202 and 204 are per-processor restrictions 402 and 404, respectively. For thread 214, VMM 400 has composed mapping 324 with mapping 307, and has modified the composition of the permissions for thread 214 and the permissions for VM 206 with per-processor restrictions 402. VMM 400 has loaded the composed mapping and the modified composed permissions into physical MMU 232. For thread 216, VMM 400 has composed mapping 326 with mapping 307, and has modified the composition of the permissions for thread 216 and the permissions for VM 206 with per-processor restrictions 404. VMM 400 has loaded the composed mapping and the modified composed permissions into physical MMU 234.

To better understand how the additional restrictions enforce determinism, it is first necessary to introduce the concepts of a "burst of execution" and the deterministic delivery of interrupts to the virtual processor, which is how VMM 400 (or equivalently, VMM 200) enforces deterministic execution of guest software running in its virtual machines. These concepts are explained in detail in U.S. Patent Publication No. 2006-0143517, published Jun. 29, 2006.

The VMM determines a burst of execution to be performed. The deterministic length of execution of this burst is not necessarily measured in actual time. As one example of how to execute for a deterministic length of execution, a count of processor instructions may be used. However, any other method that produces a deterministic result may be utilized. During this burst of execution, a physical processor handles the processing of a single virtual processor and executes the instructions of the thread or threads associated therewith. The instructions are executed by the physical processor by the VMM without additional overhead.

For example, the VMM may determine that each burst of execution is to have a deterministic length of execution of 1000 instructions executed by each of the multiple processors. More detail regarding bursts of execution and the deterministic delivery of interrupts to the virtual processor is provided below with respect to FIGS. 10-13.

Figure 5:
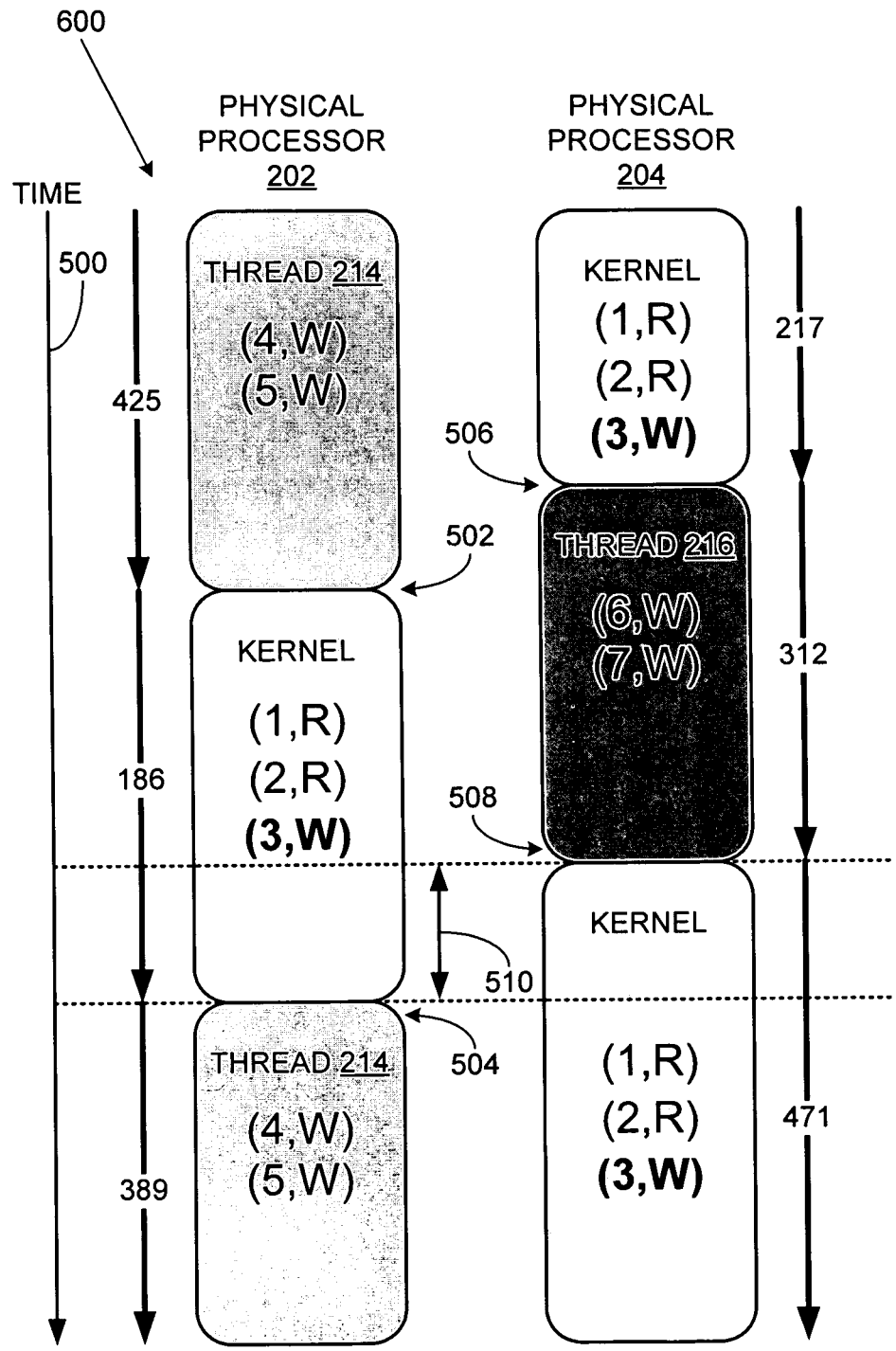
FIG. 5 is an illustration of memory access permissions in a multiprocessor machine during a single burst of execution.

FIG. 5 is an illustration of memory access permissions in a multiprocessor machine during a single burst of execution. The passage of time (as measured by the retirement of instructions) is indicated by an arrow 500. Prior to the start of a burst 600, VMM 400 has determined that during burst 600, physical processor 202 will execute 1000 instructions. The first of those instructions belongs to thread 214, but as instructions in the stream give rise to context switches, and because no asynchronous interrupts are delivered during the burst, the sequence of context switches is entirely determined before the processor begins executing the burst. In this example, the scheduling by the guest operating system to virtual processor 210 is such that the instructions call for executing 425 instructions of thread 214, the last of which calls for a context switch 502; 186 instructions of the kernel, the last of which calls for a context switch 504; and 389 instructions of thread 214. VMM 400 has also determined that during burst 600, physical processor 204 will execute 1000 instructions. The scheduling by the guest operating system to virtual processor 212 is such that the instructions call for executing 217 instructions of the kernel, the last of which calls for a context switch 506; 312 instructions of thread 216, the last of which calls for a context switch 508; and 471 instructions of the kernel.

Although in this example the VMM has determined that both physical processors will execute the same number of instructions, this is not necessarily the case. Typically, the VMM will strive to choose instruction streams that take similar amounts of real time, to maximize utilization of the physical processors. That usually involves choosing equal numbers of instructions, although a very sophisticated VMM could observe, for example, that one thread is achieving twice the instructions-per-cycle (IPC) rate of another and hence decide to run the first for 2000 instructions and the second for 1000 instructions in each burst, so that both processors are best utilized.

At context switch 502, the context of the kernel is loaded into physical processor 202. The kernel executes a return-from-system-call instruction, which switches back to the context of thread 214 at context switch 504.

Likewise, at context switch 506 the context of thread 216 is loaded into physical processor 204. Physical processor 204 then executes 312 instructions of thread 216. At context switch 508, the context of the kernel is once again loaded into physical processor 204, and physical processor 204 resumes executing instructions of the kernel from the point at which it left off at context switch 506.

Each context switch is also accompanied by a change in the memory access permissions and, depending on the processor architecture, possibly also by a change in the memory mappings. The composed memory access permissions are shown in FIG. 5. In this composition, thread 214 has permission to write pages 4 and 5 of physical machine address space 302, and the kernel has permission to read pages 1 and 2 and to write page 3 of physical machine address space 302. Likewise, the kernel has permission to read pages 1 and 2 and to write page 3 of physical machine address space 302, and thread 216 has permission to write pages 6 and 7 of physical machine address space 302.

During a period of time 510, both composed memory access permissions provide permission to write page 3. If these composed permissions were installed in physical MMUs 232 and 234, then physical processors 202 and 204 would be able to communicate in a non-deterministic manner. There would still be the possibility of non-deterministic communication even if, according to the composed permissions, the kernel were to have permission to read page 3 instead of permission to write page 3. The reason for this is that it would not be known whether physical processor 204 reads page 3 before or after physical processor 202 writes page 3.

Figure 6:
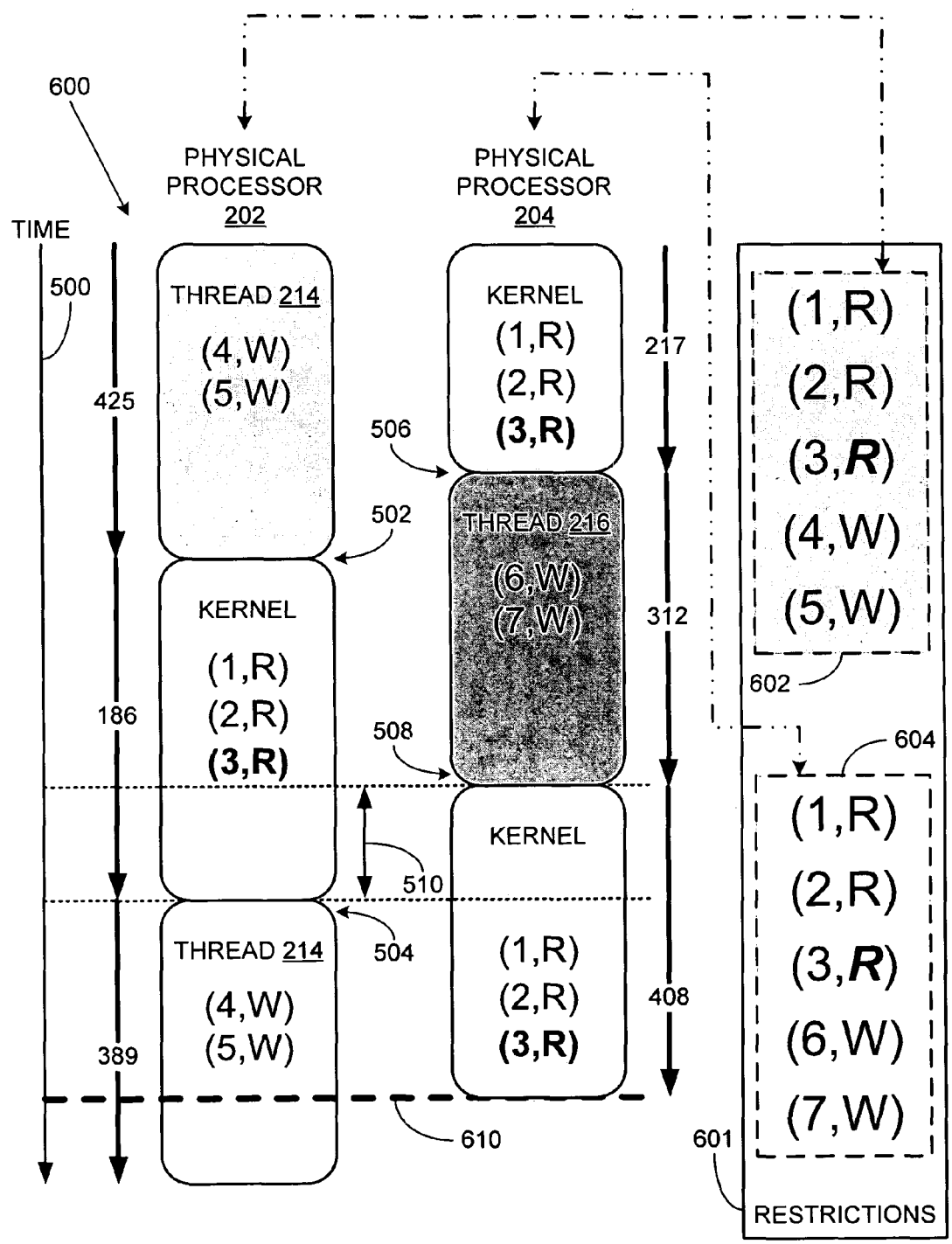
FIG. 6 is an illustration of modified memory access permissions in a multiprocessor machine during a single burst of execution.

FIG. 6 is an illustration of modified composed memory access permissions in a multiprocessor machine during a single burst of execution. Prior to the start of burst 600, VMM 400 has generated a set of restrictions 601 that apply to burst 600. Restrictions 601 comprise per-processor restrictions 602 for physical processor 202 and per-processor restrictions 604 for physical processor 204. These restrictions grant physical processors 202 and 204 permission to read page 3, but not permission to write page 3. In restrictions 601; every page allowed for writing is allowed for access only by a single processor.

At context switch 502, when physical processor 202 switches to the kernel and the guest operating system running in VM 206 installs in virtual MMU 240 the memory access permissions (1,R), (2,R) and (3,W) (ignoring the page renaming inherent in the address translation of the mapping), VMM 400 composes those permissions with the permissions it wishes to establish and modifies the composition to conform to per-processor restrictions 602. Likewise, at context switch 508, when physical processor 204 switches to the kernel and the guest operating system running in VM 206 installs in virtual MMU 242 the memory access permissions (1,R), (2,R) and (3,W) (ignoring the page renaming), VMM 400 composes those permissions with the permissions it wishes to establish and modifies the composition to conform to per-processor restrictions 604. Accordingly, the composed memory access permissions shown in FIG. 5 are modified to conform to these restrictions and the modified composed memory access permissions, as shown in FIG. 6, are installed in physical MMUs 232 and 234.

Note that during the period of time 510, physical processors 202 and 204 both have permission to read page 3. Even though it is still unknown and non-deterministic which of the two physical processors will read page 3 first, there is no non-deterministic communication via shared memory. It doesn't matter which of the physical processors reads page 3 first—they will both read the same value. Throughout the burst of execution there is no time at which any region of memory that is eligible to be written to by more than one processor, and there is no time at which any region of memory that is eligible to be written to by one of the processors is also eligible to be read by another of the processors.

In the example shown in: FIG. 6, physical processor 202 successfully executes the instructions of the kernel, even though the kernel was not granted the permission it sought for page 3. However, when physical processor 204 is executing the kernel after context switch 508, there is an instruction, say instruction #626 of the kernel, to write page 3. Execution of instruction #626 occurs at a time indicated in FIG. 6 by a dashed line 610. Since at that time physical MMU 234 has installed therein permission to read page 3, but not permission to write page 3, the hardware throws an exception. VMM 400 does not pass this exception back to the guest operating system running in VM 206, but rather halts the execution of virtual processor 212 until the end of burst 600. Therefore, although physical processor 204 ought to have executed 471 instructions of the kernel following context switch 508, only 408 instructions are actually executed.

In general, the burst of execution ends when each of the multiple processors has either completed the requisite deterministic length of execution or has been halted by the VMM due to an attempt to violate one of the additional restrictions imposed by the VMM. At the end of a burst of execution, instructions of the VMM itself are executed by the physical processors before the next burst of execution begins.

Figure 7:
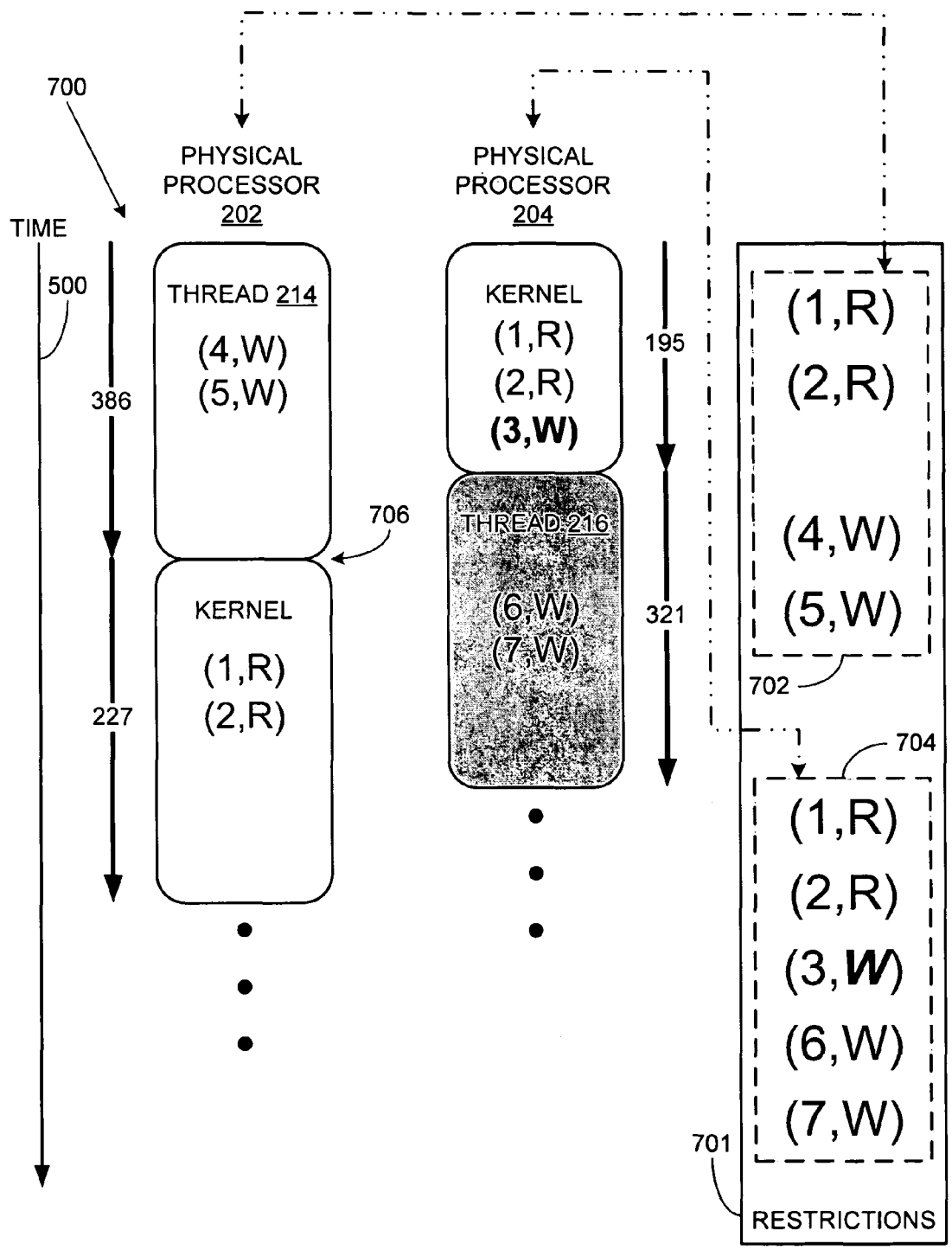
FIG. 7 is an illustration of modified memory access permissions in a multiprocessor machine during another single burst of execution, which follows the single burst of execution of FIG. 6.

FIG. 7 is an illustration of modified composed memory access permissions in a multiprocessor machine during another single burst of execution, which follows after the single burst of execution of FIG. 6. Prior to the start of a burst 700, VMM 400 has determined that during burst 700, physical processor 202 will execute 1000 instructions. In this example, the scheduling by the guest operating system to virtual processor 210 is such that the instructions call for executing 386 instructions of thread 214, the last of which calls for a context switch 706; 227 instructions of the kernel, and so on. VMM 400 has also determined that during burst 700, physical processor 204 will execute 1000 instructions. In this example, the scheduling by the guest operating system to virtual processor 212 is such that the instructions call for executing 195 instructions of the kernel, the last of which calls for a context switch; 321 instructions of thread 216, and so on.

Prior to the start of burst 700, VMM 400 also has determined a new set of restrictions 701. Restrictions 701 comprise per-processor restrictions 702 for physical processor 202 and per-processor restrictions 704 for physical processor 204. Per-processor restrictions 702 do not grant physical processor 202 any access to page 3. Per-processor restrictions 704 grant physical processor 204 permission to write page 3. In restrictions 701, every page allowed for writing is allowed for access only by a single processor.

At the start of burst 700, physical processor 202 loads the context of thread 214 and executes instructions of thread 214, resuming from the point at which it left off at the end of burst 600. Physical processor 204 loads the context of the kernel and executes instructions of the kernel, resuming from the point at which it left off at the end of burst 600, namely the instruction which resulted in the hardware exception during burst 600. The guest operating system running in VM 206 installs in virtual MMU 242 the memory access permissions (1,R), (2,R) and (3,W) (ignoring the page renaming), and VMM 400 composes those permissions with the permissions it wishes to establish, and modifies the composition to conform to per-processor restrictions 704. Since physical processor 204 now has permission to write page 3, the kernel instruction which resulted in the hardware exception during burst 600 is executed successfully during burst 700.

At a context switch 706, physical processor 202 is loaded with the context of the kernel and the guest operating system running in VM 206 installs in virtual MMU 240 the memory access permissions (1,R), (2,R) and (3,W) (ignoring the page renaming). VMM 400 composes those permissions with the permissions it wishes to establish, and modifies the composition to conform to per-processor restrictions 702. Since physical processor 202 does not have permission to read page 3 nor to write page 3, any instructions of the kernel that physical processor 202 is scheduled to execute that attempt to read or write page 3 will result in a hardware exception, and VMM 400 will halt the execution of virtual processor 210 until the end of burst 700.

Figure 8:
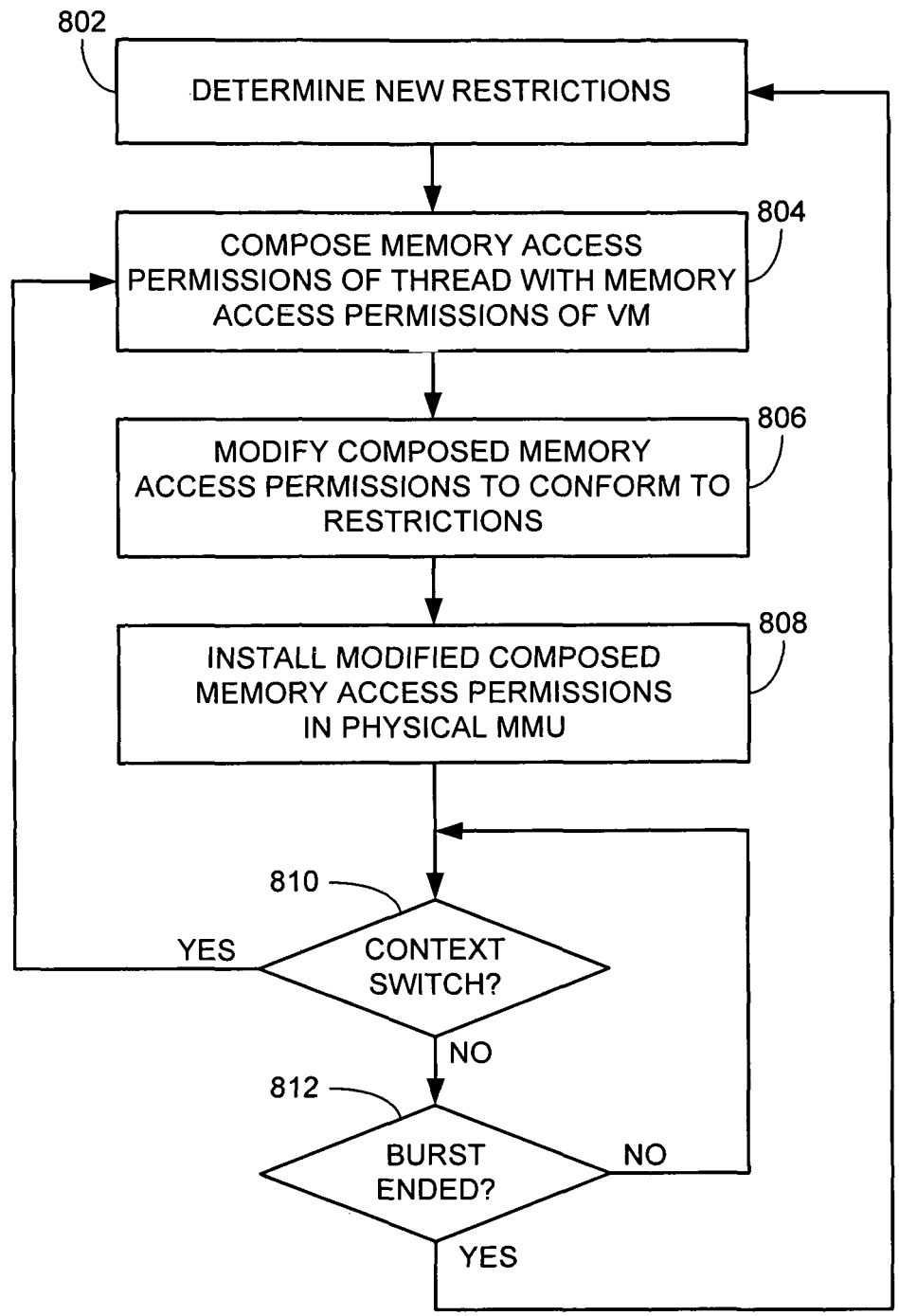
FIG. 8 is a flowchart of an exemplary method to be implemented in a virtual machine monitor to enforce that any communication via shared memory in a multiprocessor machine is deterministic.

FIG. 8 is a flowchart of an exemplary method to be implemented in a VMM to ensure that any communication via shared memory in a multiprocessor machine is deterministic. Prior to the start of a burst of execution, the VMM determines new restrictions to be applied during the burst. The restrictions are imposed by the VMM to enforce deterministic communication via the shared memory. The burst begins with the execution by a physical processor of instructions of a thread that is assigned to a virtual processor which processing is being handled by the physical processor. Before the execution begins, the VMM composes at 804 the memory access permissions of the thread with the memory access permissions of the VM to which the virtual processor belongs, modifies the composition at 806 to conform to the restrictions, and installs at 808 the modified composition in the physical MMU of the physical processor. The method then loops until a context switch occurs (checked at 810). If a context switch occurs before the end of the burst of execution (checked at 812), then the method continues from 804, with the new thread whose context is to be loaded into the physical processor. If the end of the burst of execution is reached—whether due to the physical processors having their execution halted or due to the physical processors having completed the target amount of execution—the VMM determines at 802 new restrictions to be applied during the next burst of execution.

Figure 9:
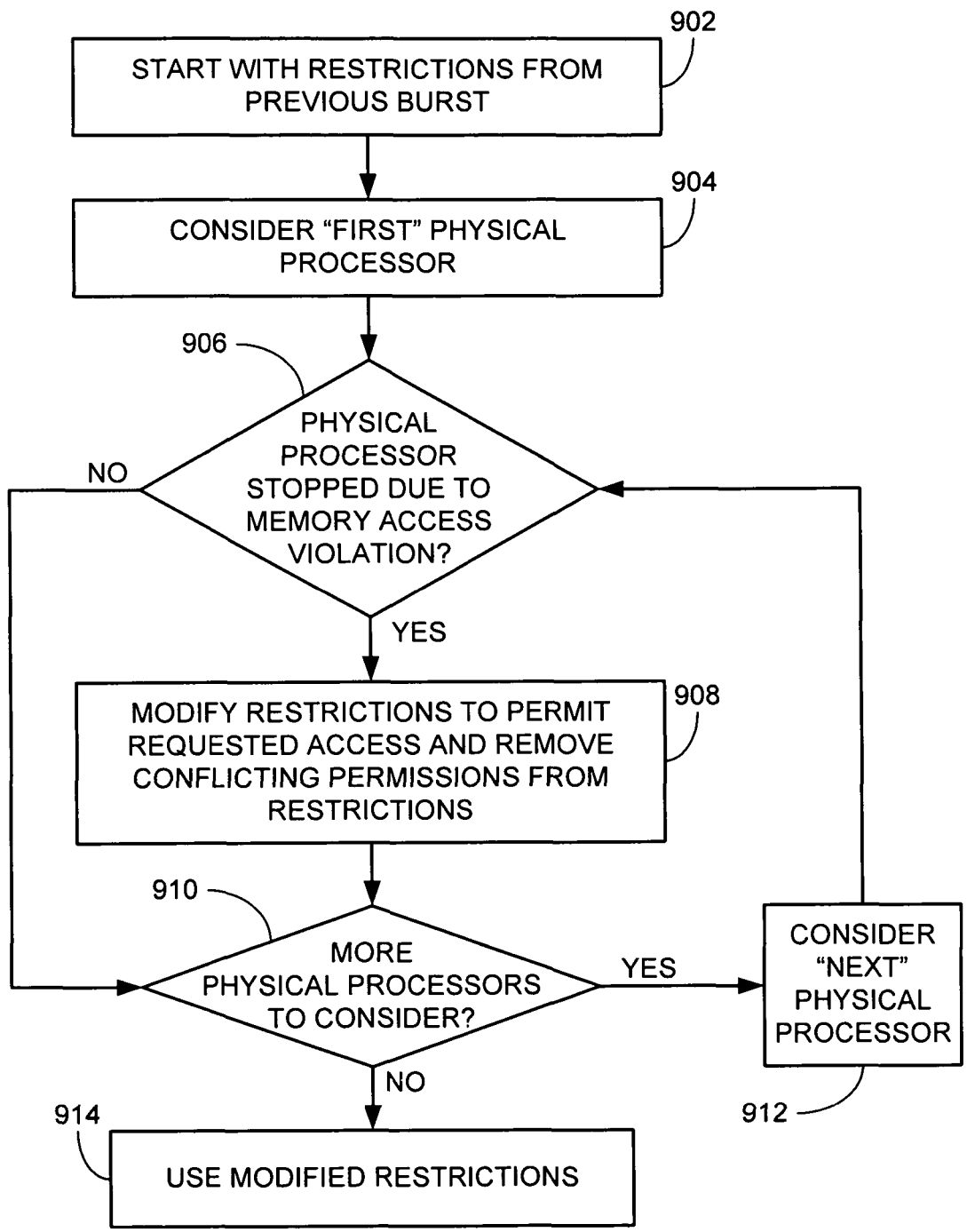
FIG. 9 is a flowchart of an exemplary method for determining memory access restrictions.

Different methods for establishing the restrictions deterministically are possible. For example, the VMM may implement a deterministic algorithm to decide what restrictions to apply during a next burst of execution. Any deterministic algorithm will suffice, although different algorithms will have different effects on the performance of the multiprocessor machine. FIG. 9 is a flowchart of an exemplary method for determining the restrictions. At 902, the VMM starts with the restrictions that were applied to a previous burst of execution. At 904, the VMM considers the "first" physical processor. At 906, the VMM considers whether execution of instructions in the physical processor was stopped in the previous burst of execution due to a memory access violation.

If there was a memory access violation, then the restrictions copied at 902 are modified to permit the memory access that was the source of the violation and to remove conflicting permissions from the restrictions. For example, if the memory access violation was that the physical processor tried to write a page to which it only has permission to read or to which it has no permission to access, then at 902, the restrictions are modified to give the physical processor permission to write the page and to remove any permissions of the other physical processors to write or read the page. In another example, if the memory access violation was that the physical processor tried to read a page to which it has no permission to access, then at 902, the restrictions are modified to give the physical processor permission to read the page and to remove any permissions of the other physical processors to write the page.

At 910, the VMM checks whether there are any physical processors that have not yet been considered. If so, then the "next" physical processor is considered at 912 and the method continues at 906. If not, the VMM may use the modified restrictions at 914.

The terms "first" and "next" are used merely to indicate that all of the physical processors are considered in some deterministic order. The actual order is not important, as long as it is deterministic. For example, the physical processors may be considered in order of increasing index, or decreasing index, or in any other deterministic order.

Another exemplary deterministic algorithm to determine the restrictions is to modify the restrictions of the previous burst of execution to permit the requested access that led to a physical processor being stopped due to a memory access violation and removing conflicting permissions from the restrictions. If there are competing requests for access to the same page, the request of the processor that successfully executed the fewest instructions in the previous burst of execution is satisfied.

Embodiments of the invention are applicable in a single multiprocessor machine. For example, software testing and/or debugging may benefit from deterministic behavior in the multiprocessor machine. Debugging non-deterministic software is difficult. When a bug occurs, the bug may be very difficult to reproduce, because subsequent runs of the software, even with identical inputs, are non-deterministic, and therefore may do something very different than the previous run that exhibited the bug. Conventionally, multiprocessor programs behave non-deterministically. By applying embodiments of the invention, a debugging environment could constrain a multiprocessor program to behave deterministically, and therefore make it possible for the programmer to reproduce bugs deterministically. For example, the debugger ought to determine the same deterministic length of execution for a particular burst of execution each time the non-deterministic software is run.

Implementation in Distributed Computing Systems

Embodiments of the invention are also applicable in a distributed computing environment having two or more multiprocessor machines. An advantage of distributed systems is the ability to continue to operate in the face of physical difficulties that would cripple a single, monolithic computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored or process executed on any one computing device can be redundantly stored on additional computing devices, allowing the information to remain accessible, even if one of the computing devices fails.

A distributed computing system can practice complete redundancy, in which every device within the system performs identical tasks and stores identical information. Such a system can allow users to continue to perform useful operations even if almost half of the devices should fail. Such a system can be used to allow multiple copies of the same information to be distributed throughout a geographic region. For example, a multi-national corporation can establish a world-wide distributed computing system.

However, distributed computing systems can be difficult to maintain due to the complexity of properly ensuring that the individual devices comprising the system perform identical operations in the same order. To facilitate this often difficult task, a state machine approach is often used to coordinate activity among the individual devices. A state machine can be described by a set of states, a set of commands, a set of responses, and client commands that link a response/state pair to each command/state pair. A state machine can execute a command by changing its state and producing a response. Thus, a state machine can be completely described by its current state and the action it is about to perform.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

A distributed computing system, as a whole, can be modeled as a state machine. Thus, a distributed computing system implementing complete redundancy can have each of the devices replicate the state of the overall system, so that each device hosts its own "replica" of the same state machine, called a replicated state machine, or RSM. Such a system requires that each RSM maintain the same state. If some replicas believe that one client command was executed, while other replicas believe that a different client command was executed, the overall system no longer operates as a single state machine.

A major disadvantage of a prior art replicated state machine computer system is that a server application must be architected as a state machine. This requirement may be very difficult to satisfy for an existing application that was not originally written as a state machine, and/or if the application was written with multiple threads of control. Even writing a new program as a deterministic state machine is not simple, because this style of programming is unfamiliar to many programmers and because it precludes the use of non-deterministic abstractions, such as threads.

Figure 10:
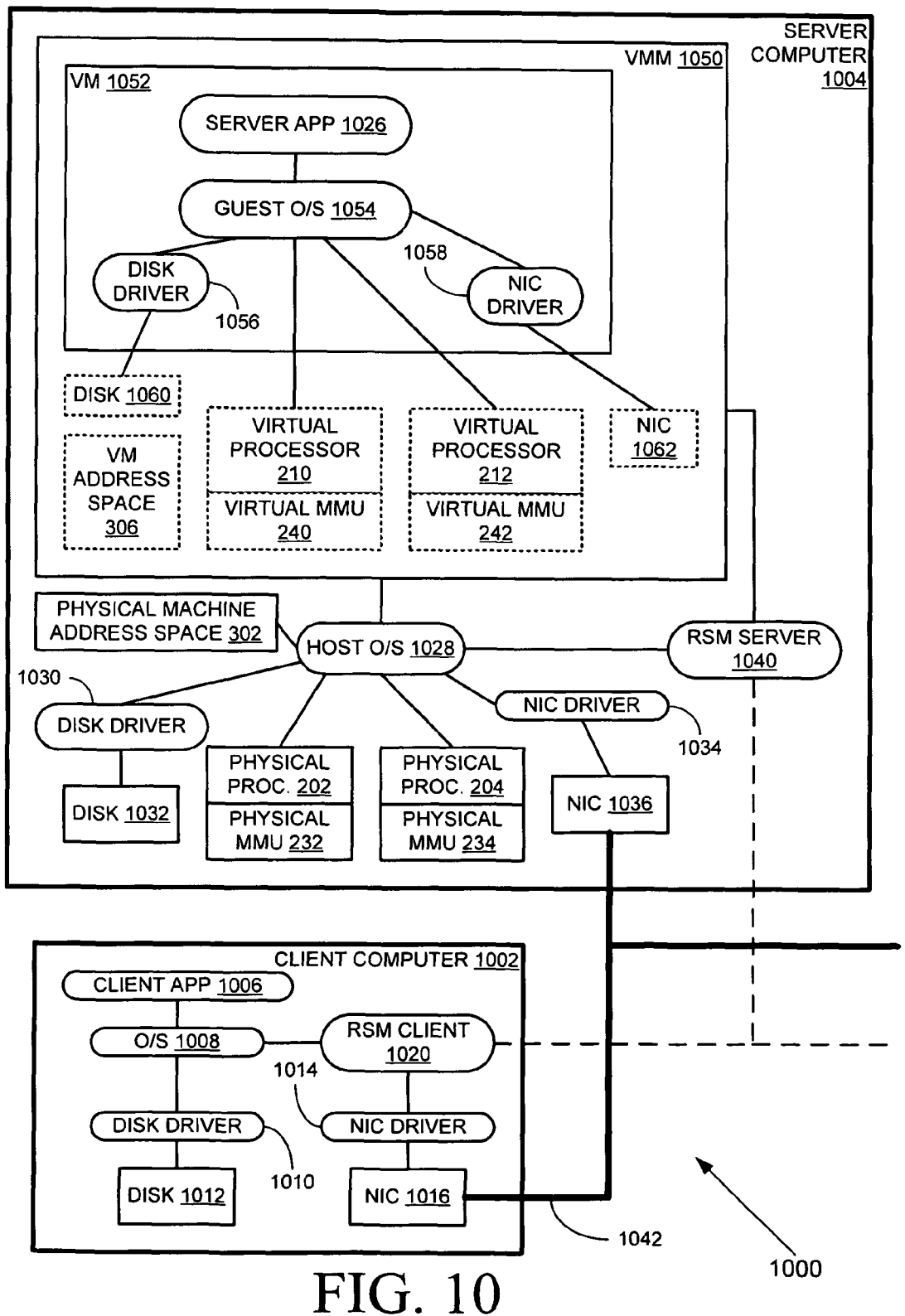
FIG. 10 is a block diagram of a replicated state machine-based client-server computer system.

FIG. 10 shows a computer system 1000 having a client computer 1002 and a server computer 1004. Although only a single server computer 1004 is shown, computer system 1000 comprises at least two server computers. Although only a single client computer 1002 is shown, several may be included in computer system 1000. Server computer 1004 may be, for example, computer 120, and client computer 1002 may be, for example, one of the remote computers 149A and 149B, described above with respect to FIG. 1. Although described as clients and servers, client computer 1002 may also serve as a server to other computers, and server computer 1004 may act as clients to other servers. Computer system 1000 is a replicated state machine-based client-server computer system. Client computer 1002 comprises a client application 1006, an operating system 1008, such as the operation system 135, a disk driver 1010 for communicating with a disk 1012, and a network interface card (NIC) driver 1014 for communicating with a NIC 1016. Client computer 1002 also comprises a replicated state machine (RSM) client driver 1020.

Each server computer 1004 comprises a server application 1026, a host operating system 1028, a disk driver 1030 and a hard disk 1032. In addition, each server computer 1004 comprises a NIC driver 1034 and a NIC 1036. Each server computer 1004 comprises a replicated state machine (RSM) server substrate 1040.

The dashed line in FIG. 10 indicates that client application 1006 communicates with server application 1026 via RSM client driver 1020 and RSM server substrate 1040. The actual path of this communication involves operating systems 1008, 1028, NIC drivers 1014, 1034, and NICs 1016, 1036. NICs 1016, 1036 are connected by a logical communication link 1042.

Network messages to and from client application 1006 are intercepted by RSM client driver 1020, which ensures that a message sent by client application 1006 is received by the replicated server applications 1026. RSM client driver 1020 does this by sending the message to the server application 1026 on each server computer 1004. However, as an optimization, it may first send the message to only one server application 1026, and if the server application does not reply correctly, it may then send the message to all server applications 1026. RSM client driver 1020 also collects replies from server applications 1026 and passes a single aggregated reply to client application 1006.

As an alternative to the replicated state machine system shown in FIG. 10, a redirector computer (not shown, but known in the art) may act as a liaison between client computer 1002 and server computers 1004. In such a computer system, client computer 1002 does not include a RSM client substrate. Instead, client computer 1002 sends network messages to the redirector computer, which replicates the messages and sends them to server computers 1004. The redirector computer also collects multiple messages from server computers 1004, which it aggregates into a single message that is sent to client computer 1002. This redirector computer may be replicated so it does not constitute a single point of possible failure.

Each server computer 1004 comprises a VMM 1050 for communicating between host operating system 1028 and one or more virtual machines 1052. VM 1052 comprises server application 1026, a guest operating system 1054, a disk driver 1056 and a NIC driver 1058.

VMM 1050 presents virtualized resources to VM 1052. For example, VMM 1050 present a virtualized disk 1060 and a virtualized NIC 1062. The VMM implements virtualized storage resources using the real storage resources it accesses through host operating system 1028, and it implements virtualized communication resources using the real communication resources it accesses through host operating system 1028. For example, the VMM uses the physical NIC 1036 to send and receive packets on behalf of the virtual NIC 1062.

RSM server substrate 1040 communicates with VMM 1050 which is configured to cause server application 1026 to act as a deterministic state machine. To do so, VMM 1050 and RSM server substrate 1040 cause VM 1052 to emulate state machine behavior. VM 1052 is not written as a deterministic state machine. Instead, VMM 1050 and RSM server substrate 1040 are configured so that actions of VM 1052 are so constrained as to be a deterministic state machine.

Server application 1026 and guest operating system 1054 execute with apparent continuity, and messages or other events arrive in an apparently asynchronous fashion. An agreement protocol is defined in which time is partitioned into a sequence of discrete intervals, and within each interval, the agreement protocol determines whether any messages are to be processed and, if there are any, the order in which to process them. As mentioned above, the concept of time here does not necessarily mean actual real time, and may be measured in other ways, for example, by the number of instructions performed by VM 1052. Once the agreement protocol completes its decision, the virtual machine is allowed to execute for a deterministic length of execution ("deterministic execution chunking"). The length of execution is the same for the VM on each server computer 1004. If there is no non-deterministic communication via shared memory, using deterministic execution chunking to divide program execution into intervals causes each virtual machine to execute to the same state.

Figure 11:
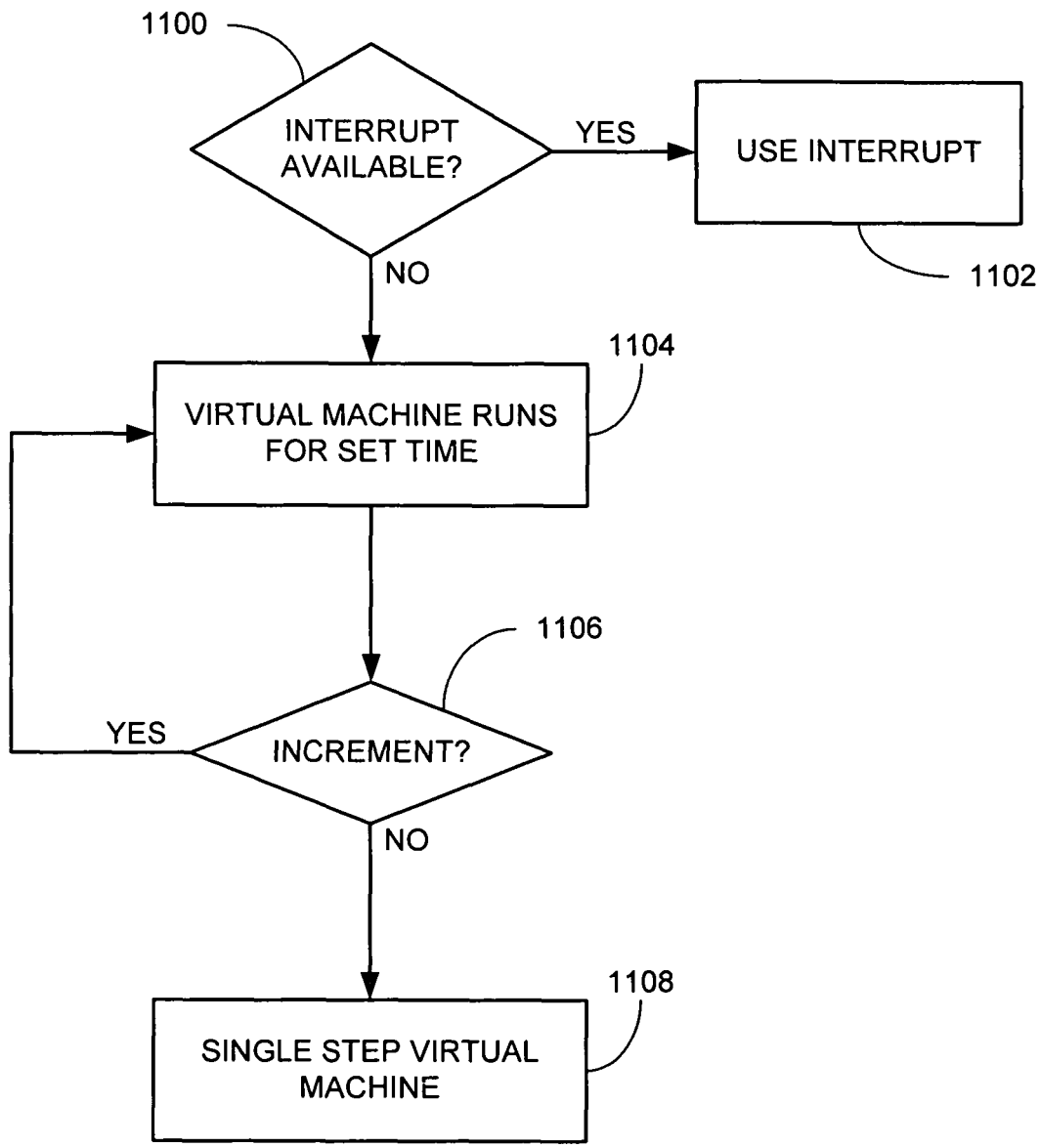
FIG. 11 is a flowchart of an exemplary method for choosing a mechanism by which the virtual machine monitor performs deterministic bursts of execution.

The specific mechanism by which the VMM performs deterministic bursts of execution may be determined in part by the processor architecture. FIG. 11 shows a flowchart generally describing an exemplary method for choosing a mechanism. Beginning at 1100, a determination is made whether the processors have an interrupt or similar mechanism that can be triggered after a certain count of retired instructions. If so, then at 1102, the interrupt is set to trigger after the target amount of execution. If the physical processors have no direct mechanism for running for a deterministic length of execution, then at 1104 the virtual machine may be allowed to run for a length of time that is guaranteed to perform no more execution than the target amount. This length of time may be calculated, for example, by knowing a length of time a target amount takes to execute when it has all the resources of efficient processors and setting the target amount to less than that time period, for example to 80% of that time period.

The amount may need to be changed as processor speed increases over time, and could be different for different server computers 1004. Different time periods may be utilized on different server computers 1004, and feedback regarding efficiency may be provided to server substrates 1040. This feedback may be used to tune later time approximations, ultimately resulting in a more efficient process.

At 1106, a determination is made whether the target execution point is far enough away so that additional time periods of execution may be used. As an example, in the original operation at 1104, the processors may be instructed to run for a second. If, for example, only sixty percent of execution is done during that period of time, a determination may be made at 1106 to loop back to 1104 and run for another, shorter length of time, such as a tenth of a second. This process may continue until the target is sufficiently close (e.g., 100,000 instructions away). Moreover, the lengths of time can be progressively smaller as the target amount is approached. After the incrementing stage of 1106, the method branches to 1108, where VM 1052 is single-stepped to the target execution point, for example by setting the processors' trap flags to single step the processors.

As an alternative to the decisions provided in FIG. 11, dynamic binary rewriting may be utilized to rewrite some of the code within VM 1052, so that that code is modified within VM 1052 prior to being handed to the processors. By altering the binary code provided to the processors, additional functionality may be provided so that the number of instructions that are run by the processors may be tracked. For example, within the binary code, counts may be maintained and may be incremented after a set number of instructions. This use of counts is a well-known technique in the field of binary rewriting. The set number is usually a "basic block", not a pre-established number of instructions, but instead a linear sequence of instructions bounded by a jump. These counts may be used to determine whether a target execution point has been reached or is approaching. Instructions may then be issued for VMM 1050 to cease operation after the count has been reached (if the count is exact), or single stepping may occur if the target amount is sufficiently close.

Binary rewriting typically slows processing significantly less than single stepping. Thus, a hybrid of binary writing and single stepping, or a hybrid of running for a set time, binary writing and single stepping may be used so as to minimize resource use and/or lag. As another alternative, single stepping of the processors may begin from the beginning, but because of the above-described slowdown in processing, this is an expensive option.

As another alternative, which is also expensive, a less conservative estimate of execution time for the VM 1052 may be permitted, even if that time permits the processors to exceed the target execution point. Because the states of the processors are tracked, the processors may be configured such that, when the target execution is exceeded, modifications may be undone back to the target execution point. Again, however, this alternative may be an expensive one.

Figure 12:
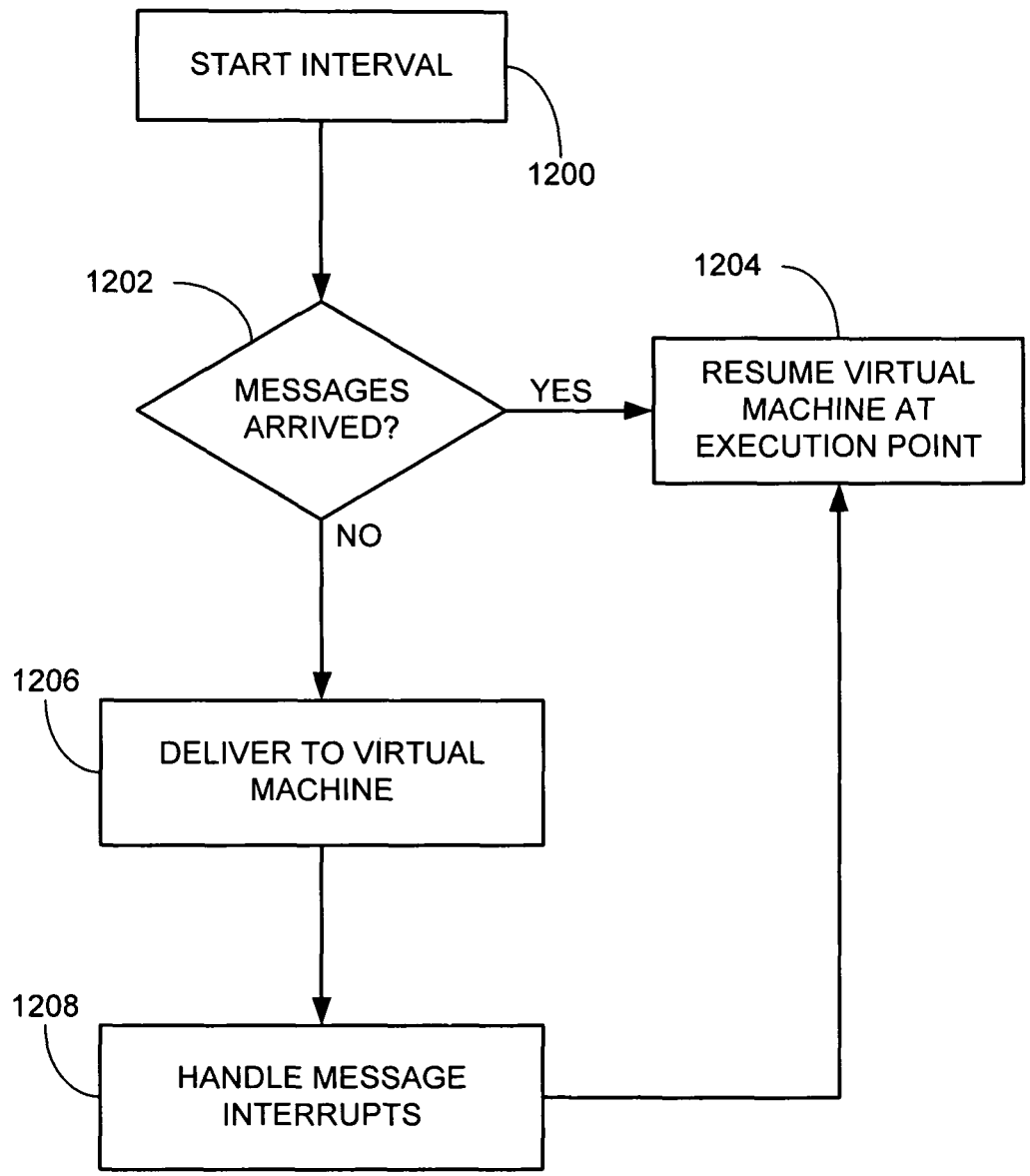
FIG. 12 is a flowchart of an exemplary method for handling a network interrupt.

Once a mechanism is established for how to run for a deterministic length of execution, this mechanism may be used with the agreement protocol established by RSM server substrate 1040 for handling network interrupts. FIG. 12 is a flowchart of an exemplary method for handling a network interrupt. Beginning at 1200, an execution interval is started. If the execution interval comprises no incoming messages, which is checked at 1202, then the method branches to 1204, where VMM 1050 begins the execution interval by resuming VM 1052 at the execution point from which it was previously interrupted. If the execution interval comprises one or more incoming messages as determined by the agreement protocol, then the method branches from 1202 to 1206, where VMM 1050 delivers the message or messages to VM 1052. To do so, VMM 1050 may vector to the VM's handling routine for interrupts from the virtual NIC 1062. At 1208, VM 1052 completes handling of the interrupts for all messages in the current execution interval. The method then loops back to 1204, where the normal interrupt return causes VM 1052 to resume at the execution point from which it was interrupted.

Thus far, network interrupts and how they are handled have been discussed. Similar devices whose behavior is non-deterministic typically because the devices involve some external input, such as network communication, may be handled in a similar manner. These devices are referred to herein as "network virtual devices," although the devices may be local.

Figure 13:
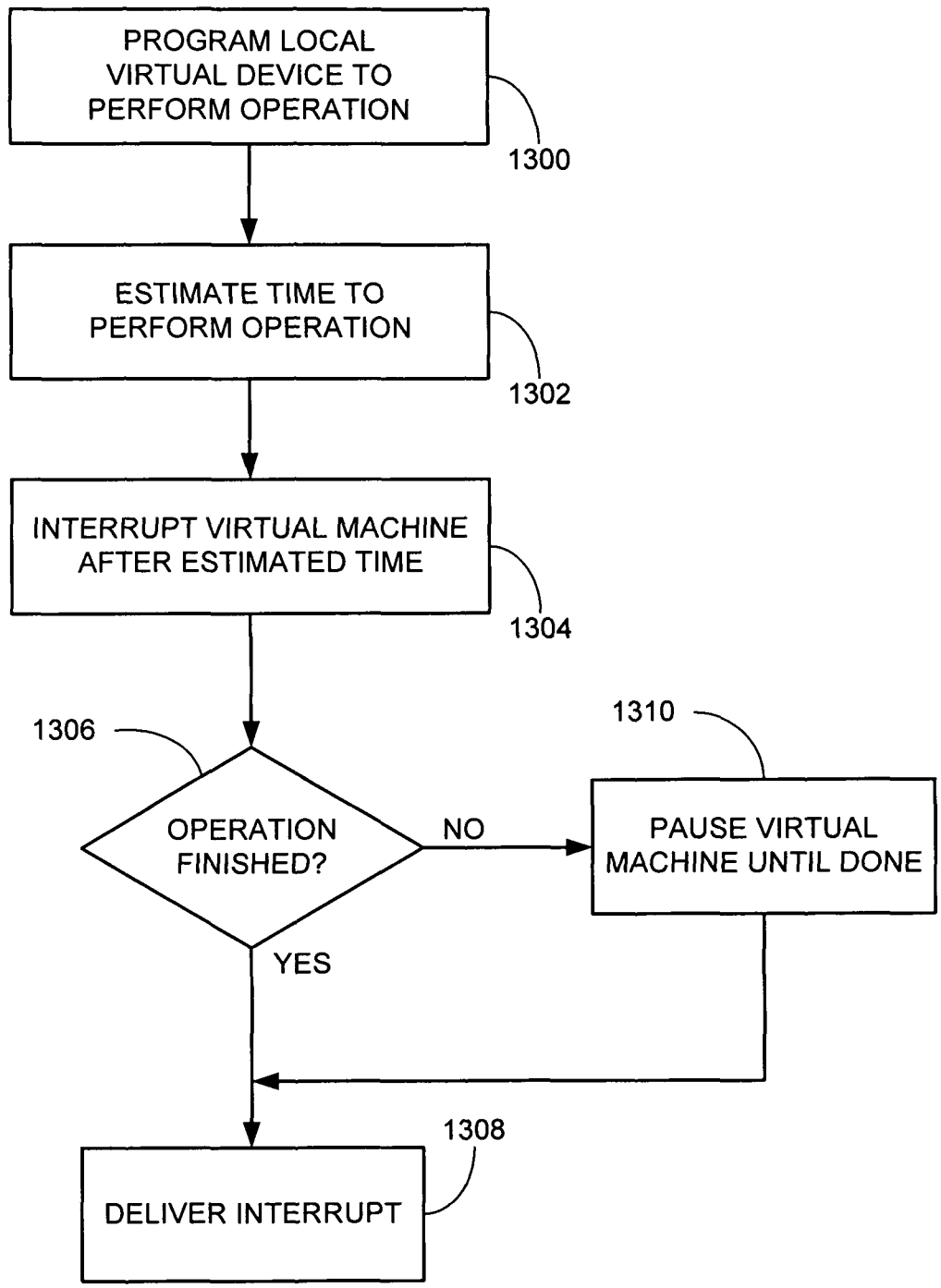
FIG. 13 is a flowchart of an exemplary method for handling interrupts from local virtual devices.

There are other types of interrupts that are also not typically delivered deterministically to VM 1052. Examples are local virtual devices, such as a disk 1060, and a virtual real time clock. Methods for handling such devices are described below. FIG. 13 is a flowchart of an exemplary method for handling interrupts from local virtual devices, such as a disk. Similar devices, whose behavior is deterministic but whose timing might not be, may be treated similarly. These devices are referred to herein as "local virtual devices," although such devices are not necessarily local.

Beginning at 1300, a local virtual device, such as the disk 1060, is programmed by VM 1052 to perform an operation. At 1302, VM 1050 estimates the time (i.e., the length of execution) to perform the operation. This estimate is performed deterministically so that all VMs 1052 utilize the same time estimate. At 1304, the VM is interrupted after the estimated period of time.

At 1306, a determination is made whether the operation has been finished. If so, the method branches to 1308, where the interrupt for the operation is delivered to VM 1052. If not, then the method branches to 1310, where VM 1052 is paused until the operation is complete. The method then proceeds to 1308, where the interrupt is delivered.

Figure 14:
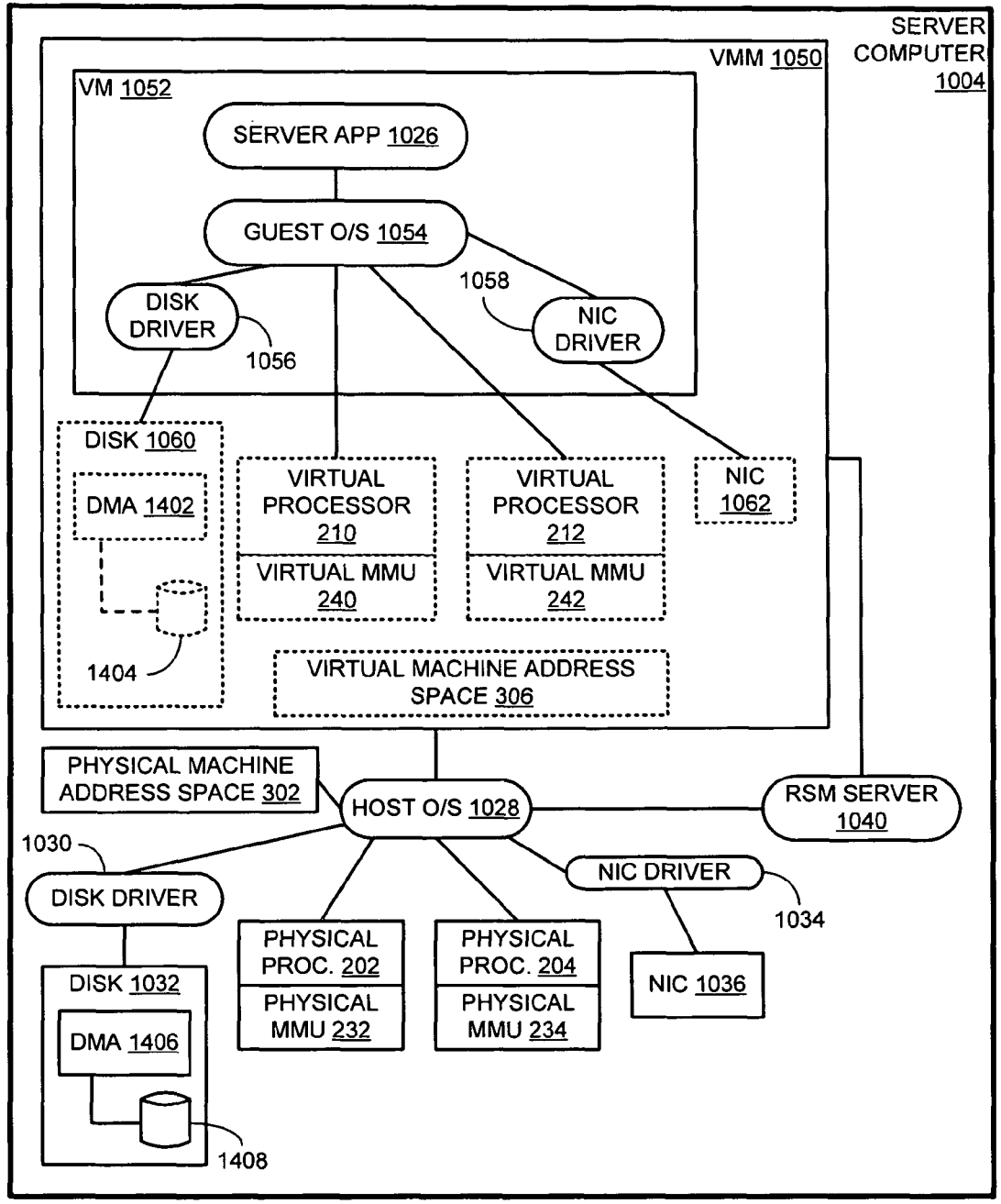
FIG. 14 is a block diagram of the server computer of FIG. 10, showing more detail of the virtual and physical disk subsystems.

FIG. 14 is utilized for an example of a local virtual device and handling of interrupts. The figure illustrates a more detailed view of the virtual and physical disk subsystems of the server computer 1004 of FIG. 10. The virtual machine monitor 1050 comprises similar components, but the virtual disk 1060 is broken into virtual direct memory access (DMA) 1402 and virtual storage 1404. Similarly, the actual disk 1032 is broken into actual direct memory access (DMA) 1406 and actual storage 1408.

When the disk driver 1056 in the virtual machine 1052 wants to read data from the virtual disk 1060, it programs the virtual direct memory access 1402 with the read request and it expects to be interrupted after the direct memory access has transferred the indicated data from the virtual disk into the memory of the disk driver 1056. The virtual machine monitor 1050 implements this behavior by performing a corresponding read operation to the physical disk, using the physical disk direct memory access 1406 and the physical disk driver 1030, accessed through the host operation system 1028.

In a conventional virtual machine monitor, when the physical read operation completes, the virtual machine monitor interrupts the virtual machine to indicate the completion of the virtual disk read. The physical disk takes an indeterminate amount of time to perform the read operation. In accordance with an embodiment of the present invention, however, the process should exhibit deterministic behavior to satisfy the requirements of a replicated state machine.

To do so, the time estimate process shown in FIG. 13 is utilized. When the virtual direct memory access 1402 is programmed to perform an operation, the virtual machine monitor 1050 deterministically estimates the length of virtual machine execution that will elapse while the direct memory access operation is performed, and executes the virtual machine 1052 for that period of time before checking to see if the operation is complete.

The estimate is performed for efficiency. As an alternative, the virtual machine monitor 1050 may pause the virtual machine 1052 immediately after programming the virtual direct memory access 1402 to perform the operation; this alternative corresponds to using a time estimate of zero. As such, the virtual machine would wait until the physical read operation completes, at which point the virtual machine monitor 1050 would deliver the virtual direct memory access interrupt to the virtual machine 1052. However, immediately stopping the virtual machine 1052 or stopping the virtual machine for a very short period of time reduces the virtual machine's computation rate by preventing the virtual machine from overlapping computation with I/O delays. While the zero-time estimate approach is deterministic, and could be used, the time estimate method described herein is more efficient. The estimate used may be as crude as a constant (e.g., every operation is estimated to take 500,000 processor instructions), or it may be computed based upon the size of the data, or it may be computed using a model parameterized by any other data available deterministically, that is, data from within the virtual machine. Regardless of how it is computed, the estimate is based on a deterministic value that is known by all copies of the virtual machines 1052. In this example, that value may involve the transfer size.

Using the techniques as described above in respect to the processor, the virtual machine monitor 1050 then interrupts the virtual machine 1052 after the indicated length of execution. If the physical read operation is already completed (because the estimate was high), then the virtual machine monitor 1050 delivers the virtual direct memory access interrupt to the virtual machine 1052. If the physical read operation has not yet completed (because the estimate was low), then the virtual machine monitor 1050 pauses the virtual machine 1052 and does not resume it until the physical read operation completes, at which point it delivers the virtual direct memory access interrupt to the virtual machine.

As described above, use of a non-zero estimate increases efficiency of the virtual machine 1052. In addition, the system operates more efficiently with increasing accuracy of the estimate. A high estimate increases the disk's data transfer latency to the virtual machine 1052. A low estimate reduces the virtual machine's computation rate.

Having set forth methods to deal with local devices and networks, most items can be handled with respect to these two methods. For example, items that behave deterministically, i.e., the items' behavior as seen by the virtual machine is not altered by processes outside the virtual machine, may be treated as local virtual devices. Many of these may be resident on a server computer 1004, such as a tape drive or CD-ROM drive. However, the devices may not be local. As an example, a remote read-only network volume may be treated as a local virtual device. As other examples, a hardware accelerator for performing vector math, or a cryptographic engine (such as a smartcard), may be treated as local virtual devices. Peripheral devices and remotely located devices can be treated like network virtual devices.

Another issue to address with respect to interrupts is the need for a clock. Physical computers typically provide a real-time clock (RTC) register that may be read by the operating system. Physical computers also typically provide a periodic clock interrupt, which is used, among other things, to timeshare the processor among several processes. For the virtual machines 1050, a clock is needed to divide execution time as discussed above. In addition, for identical virtual machines 1052, operation must be interrupted at the same execution point, and all virtual machines should read identical clock values.

In accordance with an embodiment, a periodic virtual clock interrupt is provided that is deterministic with respect to the virtual machine's execution. This clock interrupt is used as a clock for the virtual machine 1052, albeit not in real time. In accordance with the embodiment, the interrupt is triggered after a fixed length of virtual machine execution, using a technique such as that described above in the description accompanying FIG. 11. That is, available interrupts, binary rewriting, single stepping, time estimating, virtualizing of one or more processors by the virtual machine monitor 1050, or any combination of these may be used. Thus, time is measured with respect to execution instead of actual real time.

For example, if the virtual machine 1052 expects to be interrupted approximately once per millisecond, and a processor executes roughly one hundred million instructions per second, then a clock interrupt may be delivered to the virtual machine every one hundred thousand instructions. This approach guarantees determinate execution, and it provides interrupts at the required frequency for effective timesharing.

Because instructions are handled at different rates by different computers, the interrupts most likely will occur at intervals that are irregular with respect to real time. In accordance with an embodiment, a virtual real-time clock is provided that is deterministic with respect to the virtual machine's execution. In the embodiment, the virtual real-time clock value is the value of the execution counter of the virtual machine 1052, which may be a retired-instruction counter or whatever execution counter is available on the particular processor architecture. Thus, in the case of a retired-instruction counter, if the one-billionth instruction that the virtual machine executes is a read of the real-time clock, then the value returned will be one billion. If the processor architecture has an execution counter with a small number of bits, such that it risks wrapping, this counter may be extended in software using a well known technique.

In the description provided above, the real-time clock functions as a local virtual device. The virtual real-time clock may not track actual real time very well, due to variability in the execution rate of the virtual machine. If the server application 1026 requires a better actual real-time clock, the guest operating system 1054 in the virtual machine 1052 may participate in any standard clock synchronization protocol, such as network time protocol (NTP), with a computer that has a more accurate real-time clock. The computer that provides the time-synchronization information can either comprise a RSM client driver, such the as the RSM client driver 1020, or interact with a redirector computer, as described above.

The interrupts associated with the virtual clock, the local devices, and the virtual network connections described above are each related to an execute call of an RSM server substrate as is known. As described above, there are also replies that are sent by the server application 1026 to the RSM server substrate 1040, and the state of the server application 1026 needs to be tracked and transmitted to the RSM server substrate 1040.

In conventional replicated state machines, communications between client and server has a remote-procedure-call (RPC) structure. The client makes the request, and this request is ordered consistently along with requests from other clients. The server executes the request, and the server replies to the client. Thus, the reply call is typically invoked once per state update, to send the requesting client a reply to the request that initiated the state update.

In accordance with an embodiment, arbitrary applications are supported for use as the server applications 1026, even though the applications may not have been written with an RPC communication structure. In accordance with this embodiment, the server application 1026 may send a message to a client in a manner that bears no obvious relationship to the request it received from the client. In accordance with an embodiment, the messages are handled from the server in a straightforward manner: they are sent to the client or the redirector immediately. When the RSM client driver 1020 or a similar envoy (e.g., in a redirector environment) receives a sufficient number of copies of a message from the server applications 1026, the RSM client driver or redirector passes the message on to the client application 1006. Message ordering is provided by the network layer inside the virtual machine and at the redirector or client driver, such as a reliable transport layer (e.g., TCP); the present invention requires no special consideration to provide message ordering.

In addition, the RSM server substrate 1040 needs to track the state at the replicated application 1026. In accordance with an embodiment, this state comprises the state of both the virtual machine monitor 1050 and the virtual machine 1052.

Figure 15:
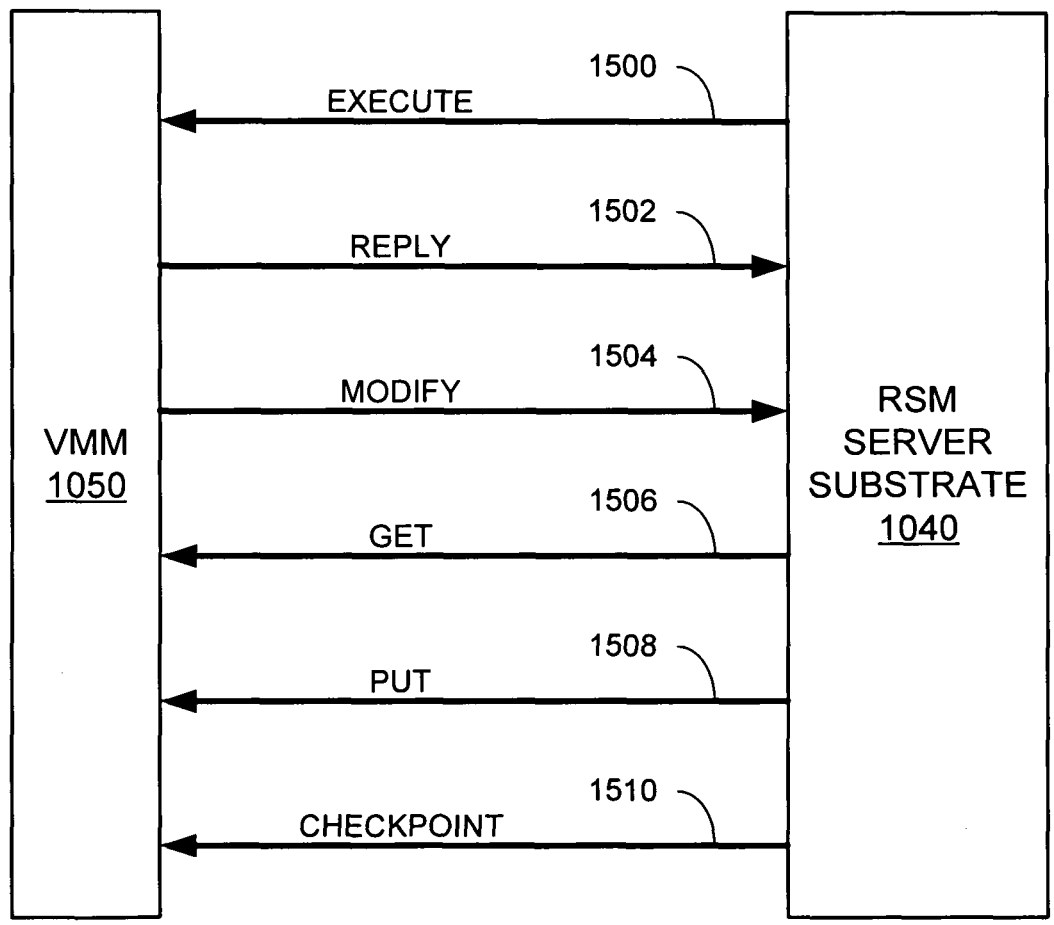
FIG. 15 is a diagrammatic representation of an example of an interface that may be presented by a replicated state machine (RSM) server substrate.

The state of the virtual machine monitor 1050 may be handled in the same manner as most replicated state machines. FIG. 15 is a diagrammatic representation of an example of an interface that may be presented by a RSM server substrate, such as RSM server substrate 1040. RSM server substrate 1040 may use an execute call 1500 to tell VMM 1050 to update its state. This execute call 1500 comprises the client message that triggered the update. VMM 1050 may use a reply call 1502 to indicate a message to send to client application 1006.

Before changing any of its state, VMM 1050 may use a modify call to warn RSM server substrate 1040 about the part of the VMM's state that is about to change. RSM server substrate 1040 may use a get call 1506 to retrieve the value of any part of the state of VMM 1050, and RSM server substrate 1040 may use a put call 1508 to change the value of a part of the state of VMM 1050.

In addition, the virtual machine monitor 1050 may persistently and atomically record its state in response to a checkpoint call 1510. There are well known techniques for each of these operations and the operations are standard in the world of replicated state machines.

To track changes to the virtual machine's memory, a known copy-on-write technique may be used. The virtual machine monitor 1050 sets the protection bits on the virtual machine's memory to non-writable at the beginning of each checkpointable interval. The checkpoint interval will likely be longer than the execution interval. Thus, when the virtual machine 1052 executes a write instruction, this execution causes a trap to the virtual machine monitor 1050. The virtual machine monitor 1050 then uses the modify call 1504 to inform the RSM server substrate 1040 that the indicated memory page is being modified. The virtual machine monitor 1050 implements the get and put call interfaces 1506, 1508 to the virtual machine's memory by reading or writing the indicated page. Lastly, the virtual machine monitor 1050 checkpoints the virtual machine's memory by recording the values of the virtual machine pages that have been modified.

In addition to the state of both the virtual machine monitor 1050 and the virtual machine 1052, the state of the processors for the server computer 1004 should also be tracked including such things as registers and program counters and other information stored with respect to processors as is known in the replicated state machine art. Also, the state of the disk 1032 and the disk driver 1030 are tracked. Any state associated with the server computer 1004 that would have an effect on restoring the server application and virtual machine to a given point is tracked.

Returning now to the issue of deterministic communication in a multiprocessor machine via shared memory, the agreement protocol described above may be utilized to ensure that for each deterministic burst of execution, VMMs 1050 on different server computers 1004 use identical memory access restrictions. This will ensure that the machines remain replicas of one another.

System 1000 in conjunction with the methods described herein therefore enables replicated services that are run on multiprocessor machines in a deterministic manner. Such a system will work with legacy software as the server application 1026, because VMM 1050 enforces determinism with respect to local interrupts, network interrupts and communication via shared memory.

Improving Interthread Communication

The memory access restrictions described above with respect to FIGS. 4-9 result in the elimination of any non-deterministic communication between physical processors via shared memory. Communication between operating system threads running on those processors communicate in that the contents of one page of memory may be transferred from one thread to another at a boundary of a deterministic burst of execution. If a substantial amount of memory is transferred from one thread to another, this scheme may be rather slow and inefficient.

For example, consider a machine with four physical processors, where two of the physical processors, say A and B, each manage to successfully execute their allotted instructions in a deterministic burst of execution, and the other two physical processors, say C and D, do not make a lot of progress because the threads assigned to the virtual processors that are scheduled to these physical processors keep communicating with each other. C waits on D, and D waits on C. The performance of the communicating guests will be poor.

Figure 16:
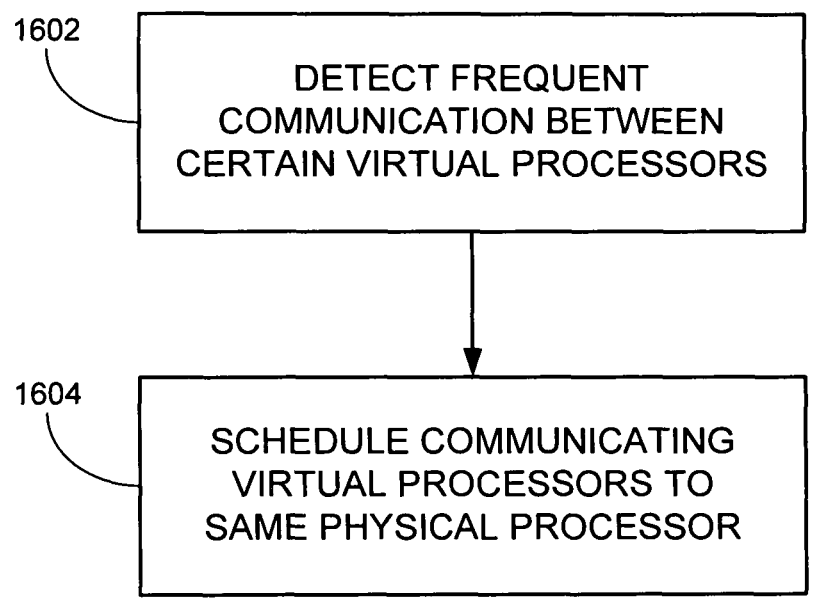
FIG. 16 is a flowchart of an exemplary method for improving interthread communication in a multiprocessor machine.

One mechanism for improving interthread communication is to arrange for the interthread communication to occur on a single physical processor. FIG. 16 is a flowchart of an exemplary method for improving interthread communication in a multiprocessor machine. If the VMM determines at 1602 that two or more virtual processors are communicating frequently, for example, because they frequently experience memory access violations on the same memory pages and do not manage to successfully execute their allotted instructions in a deterministic burst of execution, the VMM may deliberately arrange at 1604 for those virtual processors to be consistently scheduled onto the same physical processor, a scheme conventionally called "processor affinity". Indeed, if the virtual processors communicate quite frequently, the VMM may arrange to context switch them onto a single physical processor with a period smaller than the period of the bursts of deterministic execution, as long as the scheduling plan can be made deterministically. A disadvantage of processor affinity is that if the only processing demand in the multiprocessor machine is communication-intensive, then this policy will leave other physical processors idle.

Figure 17:
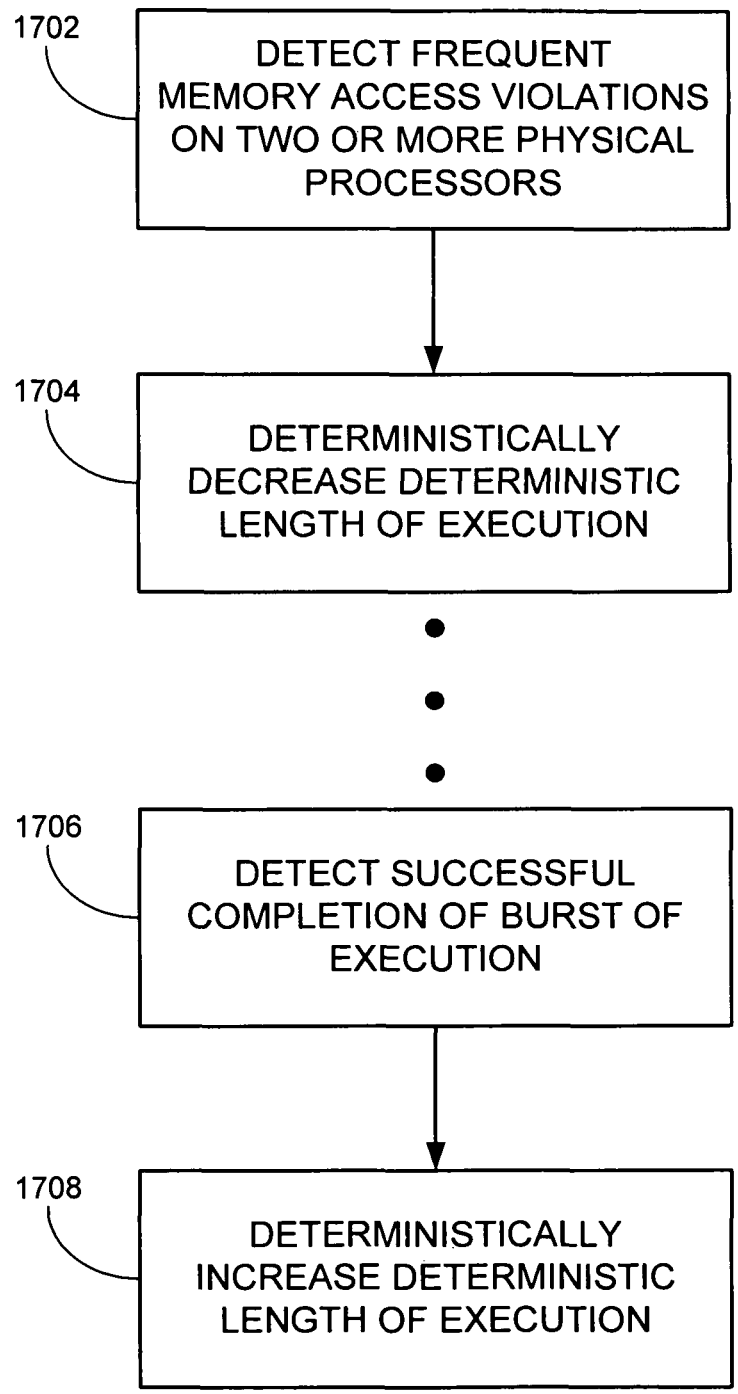
FIG. 17 is a flowchart of another exemplary method for improving interthread communication in a multiprocessor machine.

Another mechanism for improving interthread communication is for the VMM to schedule the communicating virtual processors to different physical processors and to deterministically adapt the deterministic length of execution to the memory access violation behavior. FIG. 17 is a flowchart of another exemplary method for improving interthread communication in a multiprocessor machine. If the VMM detects at 1702 that threads assigned to virtual processors that are scheduled to different physical processors are exhibiting frequent violations, then at 1704 the VMM may deterministically decrease the deterministic length of execution to enable the violations to occur at a higher rate. If the VMM detects at 1706 that bursts of execution are completed with no memory access violations, then at 1708, the VMM may increase the deterministic length of execution to reduce the overhead associated with deterministically determining the parameters of each burst of execution. The adaptation of the deterministic length of execution may be agreed upon by different multiprocessor machines using the agreement protocol described above. Alternatively, a deterministic algorithm in each multiprocessor machine may be used. For example, if the VMM detects that two consecutive bursts of execution have ended due to memory access violations, then the VMM halves the number of instructions to be executed in the next bursts of execution, and if the VMM detects that two consecutive bursts of execution have ended without any memory access violations, then the VMM doubles the number of instructions to be executed in the next burst of execution, subject to some upper bound.

Both these mechanisms may be implemented without any modifications to the guest operating systems.

Generally, a VMM provides a transparent environment to the guest software running in its virtual machines, so that a guest operating system designed to run on real hardware can run inside the VMM with no modification. However, sometimes the overall system can realize performance gains by making small changes to the guest operating system to make it aware of the VMM environment in which it runs. This is known as "paravirtualization".

If frequent communication occurs as a result of a first guest operating system thread passing a large block of memory to a second guest operating system thread, and the two threads continue to be scheduled simultaneously, then the second thread may be halted once per page in the large block due to a memory access violation. For example, if both threads request permission to write pages 3110-3415 but the restrictions generated by the VMM permit only the first physical processor (handling execution of the first virtual processor, to which the first thread is assigned) to write pages 3110-3415 and deny any access to pages 3110-3415 to the second physical processor (handling execution of the second virtual processor, to which the second thread is assigned), then when the second thread attempts to write page 3112, it will be halted. At the start of the next burst of execution, the second thread may have been permitted by the new restrictions generated by the VMM to write page 3112, but when during that burst the second thread attempts to write page 3134, it will once again be halted.

Figure 18:
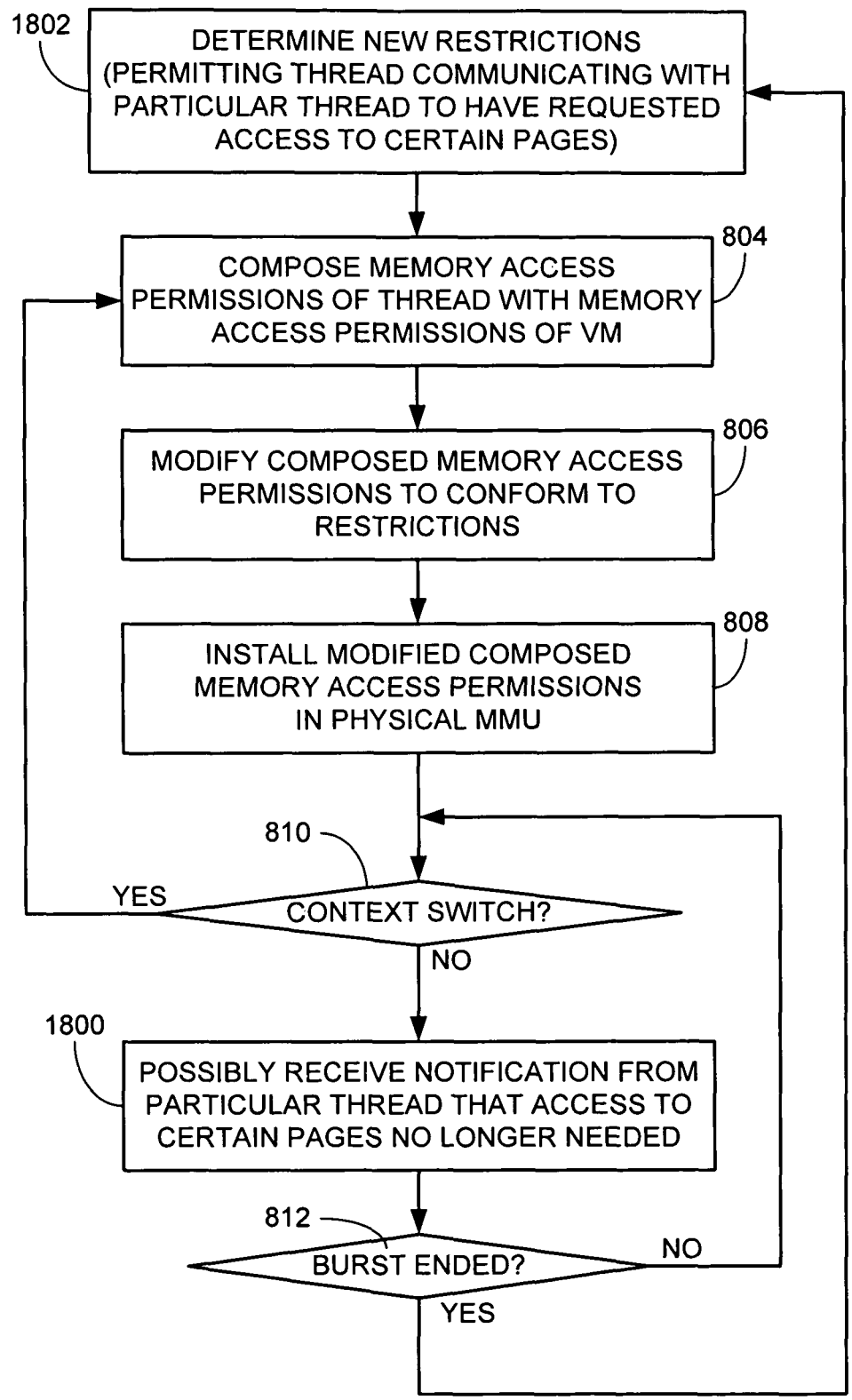
FIG. 18 is a flowchart of another exemplary method to be implemented in a virtual machine monitor to enforce that any communication via shared memory in a multiprocessor machine is deterministic.

If the guest operating system is aware of this pattern (i.e. that two threads communicating via a large block of memory continue to be scheduled simultaneously), it could cause the first thread to explicitly notify the VMM when it is done writing the pages. Typically, the communication pattern is the result of threads invoking standard operating system communications primitives. The aware operating system may use a modified implementation of each such primitive that, in addition to manipulating the shared memory, notifies the VMM which other thread is likely to read the pages next. The VMM can then transfer all of the pages to the second thread as a group, on a single boundary of a burst of execution. FIG. 18 is a flowchart of another exemplary method to be implemented in a VMM to enforce deterministic communication via shared memory in a multiprocessor machine. The method shown in FIG. 18 is similar to that shown in FIG. 8, with the following changes. At some point during a burst of execution or prior to the start of a next burst of execution, the VMM may receive at 1800 notification from a particular thread that access to certain pages of memory is no longer needed. Determining the new restrictions for the next burst of execution at 1802 (which replaces 802 of FIG. 8) may therefore include permitting a thread that is communicating with the particular thread to have its requested access to those certain pages.

For example, both threads may request permission to write pages 3110-3415. The first thread may be assigned to a first virtual processor and the second thread may be assigned to a second virtual processor. The first virtual processor and the second virtual processor may be scheduled to the first physical processor and the second physical processor, respectively. The restrictions determined by the VMM may allow the first physical processor permission to write pages 3110-3415 and may restrict the second physical processor from having any access to pages 3110-3415. Once the first thread is finished with writing pages 3110-3415, the first thread may notify the VMM of this. At the next opportunity to determine new restrictions, the VMM may allow the second physical processor permission to write pages 3110-3415 and may restrict the first physical processor from having any access to pages 3110-3415.

Many different memory page allocation algorithms are known. Instead of having the virtual processors belonging to the same virtual machine allocate memory from the same portion of the virtual machine address space, different virtual processors belonging to the same virtual machine allocate memory from different portions of the virtual machine address space, so that fewer pages of memory will need to be transferred among threads. This benefit accrues because frequently de-allocated and re-allocated pages will stay associated with a single physical processor; in contrast, in the simple single-portion scheme, a frequently reused page will be allocated to arbitrary processors, frequently requiring the VMM to change the processor's memory restrictions to accommodate the needless sharing of the page among physical processors. This may also enable one to avoid having two data structures which are frequently accessed by different threads allocated on the same page. If the data structures are allocated on different pages, the different threads won't interfere. This may be beneficial, since data structures are often smaller than a single page and memory access restrictions can only be programmed on a per-page resolution. When a virtual processor requires more memory than its pool contains, it may request pages from the pool of another virtual processor. The other virtual processor may transfer inactive pages from its pool in a single batch, as described above with respect to FIG. 18.

The current state of the art in PC-based VMs uses "shadow page tables". However, future hardware will support two levels of address translation. The mapping from a thread's virtual address space to a VM address space (and its accompanying memory access permissions), and the mapping from the VM address space to the physical machine address space (and its accompanying memory access permissions), will be installed separately in the hardware. The composition of the address translations inherent in the mappings, and the composition of the memory access permissions, will occur in the hardware on-the-fly. In machines with such hardware, the embodiments described may be modified so that the VMM modifies only the memory access permissions that accompany the mapping from the VM address space to the physical machine address space to conform to the additional memory access restrictions. The modified memory access permissions will then be installed in the hardware by the VMM.

It is obvious to one skilled in the art how to apply embodiments of the invention to VMMs having more than two physical processors. It is also obvious to one skilled in the art how to apply embodiments of the invention to multiprocessor machines having more than two physical processors.

It is obvious to one skilled in the art how to modify the embodiments that have been described above to a situation with recursive virtualization, in which a VMM is virtualizing resources of a virtual machine rather than a physical computer system. In that situation, what has been described above as "physical" may indeed be a virtualization of an actual physical piece of hardware.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enforcing deterministic execution of a thread of a guest operating system (OS) running in a virtual machine (VM) by a virtual machine monitor (VMM) on a host computer having two physical processors, the method comprising:
   receiving from the guest OS of the VM, by the VM, a first mapping and associated permissions between a virtual address space of the thread of the guest OS and a virtual address space of the VM;
   installing, by the VM, the first mapping and associated permissions into a virtual memory management unit (MMU) of a virtual processor of the VM;
   determining a second mapping and associated permissions between the virtual address space of the thread of the guest OS and a physical address space of the host computer, the second mapping and associated permissions being indicative of a policy that enforces a deterministic order of execution for a first instruction stream of the guest OS relative to a second instruction stream of the guest OS, the first instruction stream executing on a first physical processor of the two physical processors concurrently with the second instruction stream executing on a second physical processor of the two physical processors;
   installing, by the VMM, a third mapping and associated permissions into a physical MMU of the host computer that establishes memory access permissions generated by the VMM and specific to the physical MMU's associated physical processor, the third mapping and associated permissions being a composition of the first mapping and associated permissions and the second mapping and associated permissions; and
   in response to determining that the thread of the guest OS is attempting to read from or write to a memory page of the physical address space in violation of the third mapping and associated permissions, preventing the thread of the guest OS from reading from or writing to the memory page.

2. The method of claim 1, wherein the third mapping and associated permissions comprises:
   restrictions on access by the guest OS to a subset of the physical address space.

3. The method of claim 2, further comprising:
   generating, by the VM, the restrictions so that at no time is a particular region of memory accessible by more than one of the physical processors.

4. The method of claim 2, further comprising:
   generating, by the VM, the restrictions so that, when one of the physical processors has permission to write a particular region of physical memory, no other of the physical processors has permission to read or write to said particular region.

5. The method of claim 2, further comprising:
   generating, by the VM, the restrictions so that, when one of the physical processors has permission to read a particular region of physical memory, no other of the physical processors has permission to write to said particular region.

6. The method of claim 2, further comprising:
   detecting, by the VMM, communication between two virtual processors of the VM that is above a threshold; and
   scheduling, by the VMM, the two virtual processors to a single one of the physical processors.

7. The method of claim 2, further comprising:
   controlling the physical processors to complete a deterministic burst of execution by executing instructions the guest OS scheduled thereto until either a deterministic length of execution has been performed or execution has halted due to a memory access violation;
   detecting frequent memory access violations by the two physical processors; and
   deterministically decreasing the deterministic length of execution.

8. The method of claim 2, further comprising:
   controlling the physical processors to complete a deterministic burst of execution by executing instructions the guest OS scheduled thereto until either a deterministic length of execution has been performed;
   detecting that the deterministic burst of execution has completed without memory access violations; and
   deterministically increasing the deterministic length of execution.

9. The method of claim 8, wherein the deterministic length of execution comprises a number of processor-executable instructions of the guest OS.

10. The method of claim 1, further comprising:
    context switching, by the VMM, the virtual processor and an additional virtual processor on a single one of the physical processors for a first period smaller than a second period corresponding to a burst of execution.

11. The method of claim 1, further comprising:
    in response to preventing the thread of the guest OS from reading from or writing to the memory page, modifying the third mapping or permissions to allow the thread of the guest OS to read from or write to the memory page; and
    after modifying the third mapping or permissions, in response to determining that the thread of the guest OS is attempting to read from or write to the memory page, permitting the thread of the guest OS to read from or write to the memory page.

12. The method of claim 11 further comprising:
    receiving an indication from the thread of the guest OS that permission to read from or write to the memory page is no longer needed;
    in response to determining that a second thread has requested permission to read from or write to the memory page, again modifying the third mapping or permissions to allow the second thread to read from or write to the memory page; and
    after again modifying the third mapping or permissions, in response to determining that the second thread is attempting to read from or write to the memory page, permitting the thread of the guest OS to read from or write to the memory page.

13. A system for enforcing deterministic execution of a thread of a guest operating system (OS) running in a virtual machine (VM) by a virtual machine monitor (VMM), the system comprising:
a host computer comprising at least two physical processors;
a physical memory communicatively coupled to the processors when the system is operational, the physical memory bearing processor-executable instructions that, when executed upon the processors, cause the system at least to:
receive from the guest OS of the VM, by the VM, a first mapping and associated permissions between a virtual address space of the thread of the guest OS and a virtual address space of the VM;
install, by the VM, the first mapping and associated permissions into a virtual memory management unit (MMU) of a virtual processor of the VM;
determine a second mapping and associated permissions between the virtual address space of the thread of the guest OS and a physical address space of the host computer, the second mapping or permissions being indicative of a policy that enforces a deterministic order of execution for a first instruction stream of the guest OS relative to a second instruction stream of the guest OS, the first instruction stream executing on a first physical processor of the two physical processors concurrently with the second instruction stream executing on a second physical processors of the two physical processors;
install, by the VMM, a third mapping and associated permissions into a physical MMU of the host computer establishing memory access permissions generated by the VMM specific to the physical MMU's associated physical processor, the third mapping or permissions comprising a composition of the first mapping and associated permissions and the second mapping and associated permissions; and
in response to determining that the thread of the guest OS is attempting to read from or write to a memory page of the physical address space in violation of the third mapping or permissions, prevent the thread of the guest OS from reading from or writing to the memory page.

14. The system of claim 13, wherein the third mapping and associated permissions comprises:
restrictions on access by the guest OS to a subset of the physical address space.

15. A computer-readable storage device, excluding signals per se, for enforcing deterministic execution of a thread of a guest operating system (OS) running in a virtual machine (VM) by a virtual machine monitor (VMM) on a host computer comprising two physical processors, bearing computer-readable instructions that, when executed by a processor, cause the host computer at least to:
receive from the guest OS of the VM, by the VM, a first mapping and associated permissions between a virtual address space of the thread of the guest OS and a virtual address space of the VM;
install, by the VM, the first mapping and associated permissions into a virtual memory management unit (MMU) of a virtual processor of the VM;
determining a second mapping and associated permissions between the virtual address space of the thread of the guest OS and a physical address space of the host computer, the second mapping and associated permissions being indicative of a policy that enforces a deterministic order of execution for a first instruction stream of the guest OS relative to a second instruction stream of the guest OS, the first instruction stream executing on a first physical processor of the two physical processors concurrently with the second instruction stream executing on a second physical processors of the two physical processors;
install, by the VMM, a third mapping and associated permissions into a physical MMU of the host computer establishing memory access permissions generated by the VMM specific to the physical MMU's associated physical processor, the third mapping and associated permissions comprising a composition of the first mapping and associated permissions and the second mapping and associated permissions; and
prevent the VM from reading from or writing to a memory page of the physical address space, the preventing based at least in part on determining that an attempt by the thread of the guest OS to read from or write to the memory page of the physical address space violates the policy that enforces deterministic execution of the thread of the guest OS on the physical processors.

16. The computer-readable storage device of claim 15, wherein the third mapping and associated permissions comprises:
restrictions on access by the guest OS to a subset of the physical address space.

17. The computer-readable storage device of claim 16, further bearing computer-readable instructions that, when executed by a processor, cause the host computer at least to generate, by the VM, the restrictions so that at no time is a particular region of memory accessible by more than one of the physical processors.

* * * * *